United States Patent
Annema et al.

(10) Patent No.: US 9,808,019 B2
(45) Date of Patent: Nov. 7, 2017

(54) METHOD AND SYSTEM FOR HARVESTING KNEE MEAT TOGETHER WITH THIGH MEAT FROM A POULTRY LEG

(71) Applicant: MAREL STORK POULTRY PROCESSING B.V., Boxmeer (NL)

(72) Inventors: Heinze Annema, Gemert (NL); Richard Gerard Johan Drabbels, Venray (NL); Roger Pierre Hubertus Maria Claessens, Nijmegen (NL); Stefan Christianus Wilhelmus Martinus Van Den Heuvel, Oeffelt (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 15/319,783

(22) PCT Filed: Jun. 11, 2015

(86) PCT No.: PCT/NL2015/050430
§ 371 (c)(1),
(2) Date: Dec. 18, 2016

(87) PCT Pub. No.: WO2015/194945
PCT Pub. Date: Dec. 23, 2015

(65) Prior Publication Data
US 2017/0142989 A1    May 25, 2017

(30) Foreign Application Priority Data

Jun. 18, 2014 (NL) ...................................... 2013017
Jun. 18, 2014 (NL) ...................................... 2013018
Jun. 18, 2014 (NL) ...................................... 2013019

(51) Int. Cl.
*A22C 21/00* (2006.01)

(52) U.S. Cl.
CPC ...... *A22C 21/0092* (2013.01); *A22C 21/0023* (2013.01); *A22C 21/0053* (2013.01); *A22C 21/0076* (2013.01)

(58) Field of Classification Search
CPC . A22C 21/00; A22C 21/0023; A22C 21/0069; A22C 21/0076
(Continued)

(56) References Cited

U.S. PATENT DOCUMENTS

| 3,364,515 A | 1/1968 | Brown et al. |
| 3,615,692 A | 10/1971 | Lovell |

(Continued)

FOREIGN PATENT DOCUMENTS

| EP | 0 442 554 A1 | 8/1991 |
| EP | 0 763 326 A1 | 3/1997 |

(Continued)

Primary Examiner — Richard Price, Jr.
(74) Attorney, Agent, or Firm — Birch, Stewart, Kolasch & Birch, LLP

(57) ABSTRACT

A method and a corresponding system for harvesting knee meat and thigh meat from a whole leg poultry product are disclosed. The method includes providing a leg product having a thigh, a drumstick, a knee and a transverse cut at the knee. The thigh and the drumstick are connected to each other and the knee cap is intact, creating a drumstick side cut plane and a thigh side cut plane, with the leg product suspended from a poultry product carrier, arranging it adjacent to a counter element, with the drumstick side cut plane facing the counter element, bringing a knee cap scraper in engagement with the leg product adjacent to the knee cap and the counter element with the leg product at the rear of the knee cap, moving the knee cap past the knee cap scraper while the counter element engages the leg product at the rear of the knee cap, therewith scraping knee meat from the knee cap while leaving the knee meat connected to the thigh, after (Continued)

Figure 1:
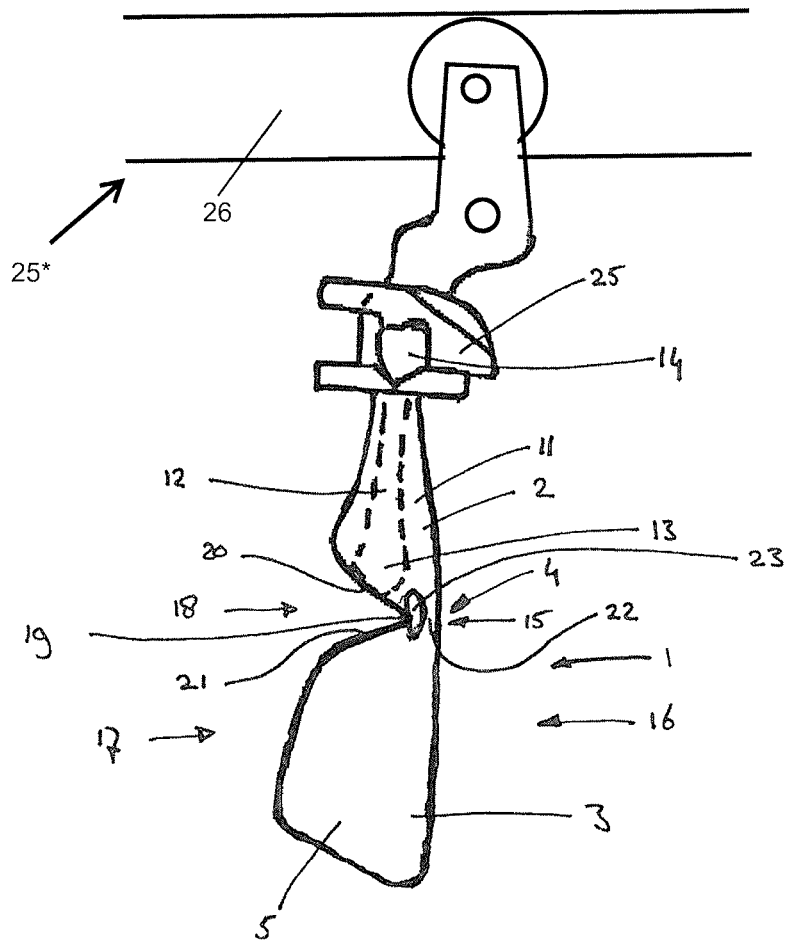

the scraping step the knee meat and thigh meat being present on a first side of the knee cap scraper and the knee cap on a second side.

24 Claims, 18 Drawing Sheets

(58) Field of Classification Search
USPC .................................................. 452/135, 136
See application file for complete search history.

(56) References Cited

U.S. PATENT DOCUMENTS

| | | | |
|---|---|---|---|
| 3,644,963 A * | 2/1972 | Terranova | A22C 17/004 452/135 |
| 4,993,113 A * | 2/1991 | Hazenbroek | A22C 21/0076 452/136 |
| 5,173,077 A | 12/1992 | van den Nieuwelaar et al. | |
| 5,176,562 A | 1/1993 | Martin et al. | |
| 5,228,881 A | 7/1993 | Sekiguchi | |
| 5,462,477 A * | 10/1995 | Ketels | A22C 17/004 269/22 |
| 5,542,879 A * | 8/1996 | Kunig | A22C 21/0076 452/135 |
| 5,961,383 A * | 10/1999 | Janssen | A22C 21/0076 452/135 |
| 5,976,004 A * | 11/1999 | Hazenbroek | A22C 21/0084 452/136 |
| 2014/0004781 A1 | 1/2014 | Stooker et al. | |
| 2014/0378040 A1* | 12/2014 | Taniguchi | A22C 17/004 452/135 |
| 2015/0250193 A1* | 9/2015 | Kido | A22C 21/0053 452/135 |

FOREIGN PATENT DOCUMENTS

| | | |
|---|---|---|
| EP | 1 639 898 A1 | 3/2006 |
| JP | 2-283236 A | 11/1990 |
| WO | WO 93/13671 A2 | 7/1993 |
| WO | WO 00/59311 A2 | 10/2000 |
| WO | WO 03/039262 A2 | 5/2003 |

\* cited by examiner

METHOD AND SYSTEM FOR HARVESTING KNEE MEAT TOGETHER WITH THIGH MEAT FROM A POULTRY LEG

The invention pertains to a system and method for harvesting knee meat together with thigh meat from a defeathered whole leg poultry product.

Poultry thigh meat is a generally high quality, tasty meat type that is highly valued by consumers. With the increased popularity of this type of poultry meat, the demand for boneless poultry thigh meat also increases. The knee of a poultry leg also contains a few grams of meat of the same or similar quality. This meat is present on the knee cap (in particular on the front and the sides thereof) and is often discarded as it is hard to harvest in an automated way by means of a device. Sometimes, this meat is harvested manually from severed knee caps, but this is inconvenient and time consuming as the knee caps are hard to grip because they are small and slippery and the connection between the knee meat and the knee cap is strong.

In the regular ways of processing defeathered whole leg poultry products, as are described e.g. in WO00/59311, the knee meat is usually trimmed off together with the knee cap and other inedible tissues from the knee area. US 2014/0004781 describes a way of removing the knee cap and the adjacent tissues, including the knee meat.

It is the aim of the invention to provide a system and method for harvesting knee meat together with thigh meat from a defeathered whole leg poultry product. The system and method according to the invention also allow to harvest the knee cap as a separate item.

In accordance with the invention, a method is provided for harvesting knee meat together with thigh meat from a defeathered whole leg poultry product, wherein the method comprises the following steps:
providing a defeathered whole leg poultry product which comprises:
a thigh, which thigh comprises at least thigh meat,
a drumstick, which drumstick comprises at least a tibia bone and drumstick meat, wherein the tibia bone has a knee side end and a tarsal joint side end,
a knee joint, which knee joint comprises at least knee meat, the knee cap and a connection between the thigh and the drumstick,
which defeathered whole leg poultry product has a front side, which is the side on which the knee cap is located, and a rear side, which is the side opposite to the front side,
in which defeathered whole leg poultry product, a transverse cut has been provided at the knee joint that extends generally in a direction transverse to the tibia bone, which transverse cut extends from the rear side of the defeathered whole leg poultry product to a cut end which is located adjacent to the rear side of the knee cap so that the thigh and the drumstick are connected to each other and the knee cap is intact, by which transverse cut a drumstick side cut plane and a thigh side cut plane are created,
arranging the defeathered whole leg poultry product in a poultry product carrier of a poultry products conveyor system, wherein the defeathered whole leg poultry product is suspended from said poultry product carrier and wherein the poultry product carrier engages the defeathered whole leg poultry product at or adjacent to the tarsal joint side end of the tibia bone,
providing a knee meat scraper device, which knee meat scraper device comprises a knee cap scraper and a counter element, which knee meat scraper device has a open state and a closed state, wherein in the open state the knee cap scraper and the counter element are spaced apart from each other, so as to allow the knee joint of the defeathered whole leg poultry product to be introduced between the knee cap scraper and the counter element,
while the defeathered whole leg poultry product is suspended from said poultry product carrier and the knee meat scraper device is in the open state, arranging the defeathered whole leg poultry product adjacent to the counter element, with the drumstick side cut plane facing the counter element,
bringing the knee meat scraper device in a closed state in which the knee cap scraper engages the defeathered whole leg poultry product at the front side adjacent to the knee cap on the drumstick side of said kneecap and in which the counter element engages the defeathered whole leg poultry product at or adjacent to the rear side of the knee cap,
performing a scraping step in which the drumstick and the knee cap scraper are moved away from each other, thereby moving the knee cap past the knee cap scraper while the counter element engages the defeathered whole leg poultry product at or adjacent to the rear side of the knee cap, therewith scraping the knee meat from the knee cap while leaving the knee meat connected to the thigh, so that after the scraping step the knee meat and thigh meat are present on a first side of the knee cap scraper and the knee cap is present on a second side of the knee cap scraper,
optionally, severing the scraped knee cap from the drumstick by cutting at a first cutting location which is situated between the knee cap and the drumstick,
optionally, severing the knee cap from the thigh and the knee meat by cutting at a second cutting location which is situated between the knee cap and the thigh, adjacent to the knee cap scraper, during which severing the knee meat and the thigh remain interconnected.

The poultry product that is processed in accordance with the method according to the invention, and therewith forms the input for the method according to the invention, is a defeathered whole leg poultry product which comprises a thigh, a drumstick and a knee joint. In practical embodiments, the leg part between the tarsal joint and the foot as well as the foot itself have already been removed. The thigh comprises at least thigh meat.

The drumstick comprises at least a tibia bone and drumstick meat. The tibia bone has a knee side end and a tarsal joint side end. The knee joint comprises at least knee meat, the knee cap and a connection between the thigh and the drumstick.

The defeathered whole leg poultry product has a front side, which is the side on which the knee cap is located, and a rear side, which is the side opposite to the front side. The knee meat is generally located on the front side of the defeathered whole leg poultry product, at the knee cap.

In the defeathered whole leg poultry product as it is processed in accordance with the method according to the invention and provided in accordance with the first step of the method according to the invention, a transverse cut has previously been provided at the knee joint. This transverse cut extends generally in a direction transverse to the tibia bone, and from the rear side of the defeathered whole leg poultry product to a cut end. This cut end is located adjacent to the rear side of the knee cap so that the thigh and the drumstick are still connected to each other and the knee cap is still intact. This means that the knee cap is not entirely cut through. It is possible that some damage is present the knee cap that was caused when the transverse cut was made. By the transverse cut, a drumstick side cut plane and a thigh side cut plane are created. The drumstick side cut plane and the thigh side cut plane are connected to each other adjacent to the cut end.

The defeathered whole leg poultry product is further sometimes in this application referred to as "the leg product" for easier reading. "The leg product" is the same as "the defeathered whole leg poultry product".

In accordance with the method according to the invention, the leg product is arranged in a poultry product carrier of a poultry products conveyor system. The leg product is suspended from said poultry product carrier, in practical embodiments usually with the drumstick being arranged above the thigh. The poultry product carrier engages the leg product at or adjacent to the tarsal joint side end of the tibia bone. The poultry product carrier can be for example a known carrier that is used in poultry leg processing systems, e.g. as shown in WO93/13671.

In accordance with the invention, a knee meat scraper device is provided. The knee meat scraper device comprises a knee cap scraper and a counter element. The knee meat scraper device has a open state and a closed state. In the open state, the knee cap scraper and the counter element are spaced apart from each other, the spacing allowing the knee joint of the leg product to be introduced between the knee cap scraper and the counter element.

Then, while the leg product is suspended from said poultry product carrier and the knee meat scraper device is in the open state, the leg product is arranged adjacent to a counter element, the drumstick side cut plane facing the counter element.

Then, the knee meat scraper device is brought into a closed state. In the closed state, the knee cap scraper engages the leg product at the front side adjacent to the knee cap on the side of the drumstick and the counter element engages the leg product at or adjacent to the rear side of the knee cap.

Then, a scraping step is performed in which the drumstick and the knee cap scraper are moved away from each other, thereby moving the knee cap past the knee cap scraper while the counter element engages the leg product at or adjacent to the rear of the knee cap. By this, the knee meat is scraped from the knee cap while leaving the knee meat connected to the thigh, in particular to the thigh meat. The counter element makes sure that the knee cap scraper remains in close contact with the leg product during the scraping to ensure effective scraping of the knee meat from the knee cap despite the strong connection between the knee meat and the knee cap. The counter element can be stationary, with the counter element engaging the leg product at the same location during the scraping of the knee meat from the knee cap and the knee cap scraper moving relative to the counter element. In a different variant, the counter element and the knee cap scraper maintain the same position relative to each other during the scraping of the knee meat from the knee cap. In that case, the leg product and the counter element move relative to each other during the scraping of the knee meat from the knee cap. After the scraping the knee meat and thigh meat are present on a first side of the knee cap scraper and the knee cap is present on a second side of the knee cap scraper.

Optionally, the scraped knee cap is severed from the drumstick by cutting at a first cutting location which is situated between the knee cap and the drumstick. Optionally, the scraped knee cap is severed from the thigh and the knee meat by cutting at a second cutting location which is situated between the knee cap and the thigh, adjacent to the knee cap scraper. During the severing of the knee cap from the thigh and the knee meat, the knee meat and the thigh remain interconnected.

With this method according to the invention, the knee meat is harvested together with the thigh meat as a unitary piece of meat, and the knee meat and thigh meat remain interconnected with each other. Therewith, the knee meat adds to the thigh meat yield.

Furthermore, when carrying out the method according to the invention, a knee cap generally without knee meat is one of the end products. In some countries, this is regarded as a delicacy. The scraped, generally meat free knee cap can alternatively be used as a resource for the pharmaceutical and/or cosmetic industry.

In a possible embodiment of the method according to the invention, the step of providing the leg product comprises two stages. In this embodiment, first a leg product is provided which comprises a thigh, a drumstick and a knee joint. In practical embodiments, the leg part between the tarsal joint and the foot as well as the foot itself have already been removed. In this embodiment, the thigh comprises at least thigh meat. Optionally, a thigh bone is also present in the thigh.

The drumstick comprises at least a tibia bone and drumstick meat. The tibia bone has a knee side end and a tarsal joint side end. The knee joint comprises at least knee meat, the knee cap and a connection between the thigh and the drumstick. The defeathered whole leg poultry product has a front side, which is the side on which the knee cap is located, and a rear side, which is the side opposite to the front side.

In this embodiment, in the second stage of the step of providing the leg product, the transverse cut at the knee joint is made by using a knee cutter. This transverse cut extends generally in a direction transverse to the tibia bone and—if present—to the thigh bone, and from the rear side of the leg product to a cut end. This cut end is located adjacent to the rear side of the knee cap so that the thigh and the drumstick are still connected to each other and the knee cap is still intact. By the transverse cut, a drumstick side cut plane and a thigh side cut plane are created. The drumstick side cut plane and the thigh side cut plane are connected to each other adjacent to the cut end.

In a possible embodiment, initially the thigh bone is present in the leg product, but the thigh bone is removed from the thigh prior to the step of arranging the leg product adjacent to a counter element with the drumstick side cut plane facing the counter element.

In an alternative embodiment, also initially the thigh bone is present in the leg product, but the thigh bone is not removed. In this embodiment, the method according to the invention is carried out on a leg product in which the thigh comprises thigh meat as well as the thigh bone.

In a possible embodiment, the drumstick is supported during at least the scraping step of the method according to the invention by a drumstick support element, when the drumstick and the knee meat scraper device are being moved away from each other to effect the scraping of the knee meat from the knee cap. This drumstick support element engages the drumstick at the drumstick side cut plane. This way, the drumstick is not or hardly subjected to tensile forces when the knee meat is being scraped from the knee cap. This in particular reduces the risk that the tibia bone breaks near the tarsal joint side end. A further advantage is that by making the drumstick side cut plane engage the drumstick support element, the position of the drumstick side cut plane relative to the knee cap scraper and the counter element is accurately defined and also made independent of the length of the drumstick. As the knee cap is located close to the drumstick side cut plane, the knee cap is also accurately positioned relative to the knee cap scraper and the counter element, again independent of the length of the drumstick.

Preferably, the part of the drumstick support element that actually engages the drumstick side cut plane of the drumstick, extends substantially perpendicular to the direction in which the drumstick and the knee cap scraper move relative to each other during the scraping of the knee meat from the knee cap.

Optionally, the drumstick support element engages the tibia bone when the drumstick and the knee meat scraper device are being moved away from each other. By doing this, the tibia bone is not or hardly subjected to forces caused by the scraping of the knee meat from the knee cap.

In a possible embodiment, the counter element and/or the knee cap scraper of a knee meat scraper device bring the drumstick into engagement with the drumstick support element. The counter element and/or the knee cap scraper engage the drumstick and for example lift the drumstick up to a level and/or a position above the drumstick support element. Then, the drumstick is lowered or otherwise moved onto the drumstick support element.

In a possible embodiment, before the knee meat scraper device is brought into its closed state, the counter element is arranged in or brought into a position adjacent to but at a distance from the drumstick side cut plane. This can be the position in which the counter element is in the open state of the knee meat scraper device. Then, in this embodiment, the counter element is moved towards the drumstick until it engages the drumstick side cut plane. Then, the counter element moves the drumstick side cut plane towards and into a predetermined drumstick reference position, preferably while the counter element remains in engagement with the drumstick side cut plane. The location of the drumstick reference position relative to the position of the knee cap scraper is known. As the knee cap is located close to the drumstick side cut plane and the position of the drumstick side cut plane is known when the drumstick side cut plane is in the drumstick reference position, the location of the knee cap relative to the knee cap scraper is also quite accurately known when the drumstick side cut plane is in the drumstick reference position.

This way, the counter element positions the drumstick and the knee cap in a reliable way relative to the knee cap scraper before the knee cap scraper engages the front side of the leg product adjacent to the knee cap on the drumstick side of the knee cap. Furthermore, the position of the drumstick side cut plane relative to the knee cap scraper is made independent of the length of the drumstick. Optionally, the drumstick reference position in which the counter element brings the drumstick side cut plane is a position in which the knee cap scraper engages the front side of the leg product adjacent to the knee cap on the drumstick side of the knee cap. In this variant, when the drumstick side cut plane is in the drumstick reference position, the knee meat scraper device is in its closed state.

In a variant of this embodiment, the counter element has a front side and a top side. In this variant, the counter element is also moved towards the rear side of the knee cap until it engages the rear side of the knee cap. Then, the counter element then moves the knee joint of the leg product to an end-of-stroke position, preferably over a small distance. Then, the counter element moves towards the drumstick side cut plane until the top side of the counter element engages the drumstick side cut plane. The top side of the counter element remains in engagement with the drumstick side cut plane and moves the drumstick side cut plane towards and into the drumstick reference position. The front side of the counter element remains in contact with the rear of the knee cap when the counter element moves from the end-of-stroke position towards and into the drumstick reference position. Optionally, in this movement, the counter element moves back in a direction towards the rear side of the leg product.

In a possible embodiment, the counter element moves the knee joint to the end-of-stroke position, but not the drumstick side cut plane to the drumstick reference position.

In a possible embodiment, the drumstick and the knee cap scraper are moved relative to each other by a lifter which moves the drumstick relative to the knee cap scraper. The lifter is moveable between a retracted position and an extended position and engages the drumstick during at least a part of the lifter's movement from the retracted position to the extended position.

Optionally, the lifter supports, or even engages, the tibia bone during at least a part of the lifter's movement from the retracted position to the extended position. By doing this, the tibia bone is not or hardly subjected to forces due to the scraping of the knee meat.

As an alternative or in addition, the counter element and the knee cap scraper are moved away from the poultry product carrier, e.g. in a downward direction, in order to move the drumstick away from the counter element and the knee cap scraper.

In a possible embodiment, before severing the knee cap from the drumstick, the knee cap is pulled away from the drumstick side cut plane. The first cutting location is in this embodiment aligned with the drumstick side cut plane or located between the drumstick side cut plane and the knee cap when the knee cap is severed from the drumstick. This has the advantage that the risk of damaging the drumstick when severing the knee cap from the drumstick is reduced. Furthermore, the pulling away of the knee cap from the drumstick side cut plane offers the opportunity to keep the connection between the thigh and the drumstick under tension during the action of severing the knee cap from the drumstick, which facilitates a controlled severing of the knee cap and the drumstick.

Optionally, in this embodiment, the knee cap is pulled below the drumstick side cut plane. In that case, the first cutting location is aligned with the drumstick side cut plane or located below the drumstick side cut plane when the knee cap is severed from the drumstick. Preferably, the knee cap is pulled down so far that it is entirely below the drumstick side cut plane before the severing is performed.

In any of the embodiments in which before severing the knee cap from the drumstick the knee cap is pulled away the drumstick side cut plane, the pulling is optionally caused by the scraping the knee meat from the knee cap. This way, no further structural elements, such as guides or pullers, have to be provided in order to effect the pulling.

The knee cap follows a scraping path relative to the knee cap scraper during the scraping of the knee meat from the knee cap. This scraping path can be a straight line, but in a possible embodiment this scraping path is non-linear and comprises a change of direction, e.g. two rectilinear path sections at an angle relative to one another. The change of direction may be designed to occur when the knee cap contacts an edge of the knee cap scraper. In such an embodiment, the knee cap is pulled over this edge in close contact with the knee cap scraper, making this edge of the knee cap scraper a more effective scraping edge.

In a possible variant of this embodiment with the non-linear scraping path, a space is present between the first side of the knee cap scraper and the counter element, e.g. between the first side of the knee cap scraper and the top of the counter element, when the knee meat scraper device is in the closed state. This space extends at an angle, optionally even substantially perpendicular, to the direction in which the drumstick is moved away from the counter element and the knee cap scraper.

In this variant with the space between the first side of the knee cap scraper and the counter element, when the knee meat scraper device is moved from its open state into its closed state, the knee cap with the knee meat still on it ends up in this space between the first side of the knee cap scraper and the counter element. Once the scraping starts due to the drumstick and the knee cap scraper being moved away from each other, the knee cap is pulled from this space, via the edge of the knee cap scraper, and then in the direction in which the drumstick is moved away from the counter element and the knee cap scraper. The knee meat is held back by the edge of the knee cap scraper while the knee cap passes over this edge, which results in scraping knee meat from the knee cap.

The edge of the knee cap scraper can be sharp or dull.

In a possible embodiment, the knee cap scraper and the counter element sever the knee cap from the interconnected thigh and knee meat in a scissors-like action. In this embodiment, preferably at least one of the knee cap scraper and the counter element is provided with a sharp edge.

In a possible embodiment, the method according to the invention is carried out in a carrousel machine. The carrousel machine can comprise one or more processing devices that move along with a leg product that undergoes the method according to the invention. In a carrousel machine, the processing devices are mounted to be movable along a circular or other loop-shaped path, e.g. an elliptical path or a path made up out of a combination of straight lines and curves.

The invention further pertains to a system for harvesting knee meat together with thigh meat from a defeathered whole leg poultry product, wherein the defeathered whole leg poultry product comprises:
  a thigh, which thigh comprises at least thigh meat,
  a drumstick, which drumstick comprises at least a tibia bone and drumstick meat, wherein the tibia bone has a knee side end and a tarsal joint side end,
  a knee joint, which knee joint comprises at least knee meat, the knee cap and a connection between the thigh and the drumstick,
  which defeathered whole leg poultry product has a front side, which is the side on which the knee cap is located, and a rear side, which is the side opposite to the front side,
  in which defeathered whole leg poultry product, a transverse cut has been provided at the knee joint that extends generally in a direction transverse to the tibia bone, which transverse cut extends from the rear side of the defeathered whole leg poultry product to a cut end which is located adjacent to the rear side of the knee cap so that the thigh and the drumstick remain connected to each other and the knee cap remains intact, by which transverse cut a drumstick side cut plane and a thigh side cut plane are created, wherein the system comprises:
  a poultry products conveyor, comprising:
    a track,
    a plurality of poultry product carriers which are spaced apart from one another in the direction of the track and which are movable along said track, wherein each poultry product carrier is adapted to hold at least one defeathered whole leg poultry product at the tarsal joint side end thereof such that the poultry product is conveyed hanging suspended from said carrier,
  a knee meat and thigh meat harvester device, which is arranged along the track of the poultry products conveyor, which knee meat and thigh meat harvester device comprises:
    a knee meat scraper device, which comprises:
      a knee cap scraper,
      a counter element, which counter element is arranged at a distance from the track of the poultry products conveyor that enables to arrange the defeathered whole leg poultry product adjacent to the counter element, with the drumstick side cut plane facing the counter element, while the defeathered whole leg poultry product is suspended from said poultry product carrier,
    which knee meat scraper device has a open state and a closed state, wherein in the open state the knee cap scraper and the counter element are spaced apart from each other, allowing the knee joint of the defeathered whole leg poultry product to be introduced between the knee cap scraper and the counter element, and wherein in the closed state the knee cap scraper engages the front of the defeathered whole leg poultry product at or adjacent the knee cap on the drumstick side of said kneecap and the counter element engages the defeathered whole leg poultry product at or adjacent the rear of the knee cap in order to allow scraping of the knee meat from the knee cap,
    a scraping motion device, that is adapted to cause a relative movement of the drumstick and the knee cap scraper away from each other, thereby moving the knee cap past the knee cap scraper while the counter element engages the defeathered whole leg poultry product at or adjacent to the rear side of the knee cap, thereby inducing the scraping of the knee meat from the knee cap while leaving the knee meat connected to the thigh, wherein after the scraping the knee meat and thigh meat are present on a first side of the knee cap scraper and the knee cap on a second side of the knee cap scraper,
    optionally, a drumstick-knee cap separator which is adapted and arranged to sever the knee cap from the drumstick after the knee meat has been scraped off the knee cap, which drumstick-knee cap separator is adapted and arranged to make a cut at a first cutting location which is situated between the knee cap and the drumstick,
    optionally, a knee cap-thigh separator which is adapted and arranged to sever the knee cap from the thigh and the knee meat after the knee meat has been scraped from the knee cap, which knee cap-thigh separator is adapted and arranged to make a cut at a second cutting location which is situated between the knee cap and the thigh, adjacent to the knee cap scraper, during which severing the knee meat and the thigh remain interconnected.

With this system according to the invention, the method according to the invention can be carried out.

The input product to be processed by the system according to the invention is the same type of defeathered whole leg poultry product ("leg product") as is provided in the first step of the method according to the invention or in any of the embodiments thereof.

So, the system according to the invention is suitable for processing a defeathered whole leg poultry product, which defeathered whole leg poultry product comprises a thigh, a drumstick and a knee joint. The thigh of this defeathered whole leg poultry product comprises at least thigh meat, and the drumstick comprises at least a tibia bone and drumstick meat. The tibia bone of said drumstick has a knee side end and a tarsal joint side end.

The knee joint of the defeathered whole leg poultry product for the processing of which the system according to the invention is suitable, comprises at least knee meat, the knee cap, a connection between the thigh and the drumstick and a transverse cut.

This transverse cut at the knee joint extends generally in a direction transverse to the tibia bone, and extends from the rear side of the defeathered whole leg poultry product to a cut end which is located adjacent to the rear side of the knee cap so that the thigh and the drumstick remain connected to each other and the knee cap remains intact. The rear side of the defeathered whole leg poultry product is the side opposite to the front side, and the front side is the side on which the knee cap is located.

The transverse cut at the knee joint is delimited on the side of the drumstick by a drumstick side cut plane and on the side of the thigh by a thigh side cut plane.

The system according to the invention comprises a poultry products conveyor. This poultry products conveyor comprises a track and a plurality of poultry product carriers. The poultry product carriers are spaced apart from one another in the direction of the track and are movable along said track. Each poultry product carrier is adapted to hold at least one leg product at the tarsal joint side end thereof such that the poultry product is conveyed hanging from said carrier. The poultry product carrier can be for example a known carrier that is used in poultry leg processing systems, e.g. as shown in WO93/13671.

The system according to the invention further comprises a knee meat and thigh meat harvester device. This device is arranged along the track of the poultry products conveyor. The knee meat and thigh meat harvester device comprises a knee meat scraper device, a scraping motion device, a drumstick-knee cap separator and a knee cap-thigh separator. The knee meat scraper device comprises a knee cap scraper and a counter element.

The counter element is arranged at a distance from the track of the poultry products conveyor, which distance is selected to make it possible to arrange the leg product adjacent to the counter element with the drumstick side cut plane facing the counter element while the leg product is suspended from said poultry product carrier.

The knee meat scraper device has an open state and a closed state. In the open state the knee cap scraper and the counter element are spaced apart from each other, allowing the knee joint of the leg product to be introduced between the knee cap scraper and the counter element. In the closed state the knee cap scraper engages the front of the leg product at or adjacent the knee cap on the drumstick side of said knee cap and the counter element engages the leg product at or adjacent the rear of the knee cap in order to allow scraping of the knee meat from the knee cap.

The knee meat and thigh meat harvester device further comprises a scraping motion device, that is adapted to cause a relative movement of the drumstick and the knee cap scraper away from each other. By this movement, the knee cap is pulled past the knee cap scraper while the counter element engages the leg product at or adjacent to the rear of the knee cap. This induces the scraping of the knee meat from the knee cap while leaving the knee meat connected to the thigh, in particular to the thigh meat.

The counter element makes sure that the knee cap scraper remains in close contact with the leg product during the scraping to ensure effective scraping of the knee meat from the knee cap despite the strong connection between the knee meat and the knee cap. The counter element can be stationary, with the counter element engaging the leg product at the same location during the scraping of the knee meat from the knee cap and the knee cap scraper moving relative to the counter element. In a different variant, the counter element and the knee cap scraper maintain the same position relative to each other during the scraping of the knee meat from the knee cap. In that case, the leg product and the counter element move relative to each other during the scraping of the knee meat from the knee cap.

After the scraping the knee meat and thigh meat are present on a first side of the knee cap scraper and the knee cap on a second side of the knee cap scraper.

In operation of the system according to the invention, first the knee meat scraper device is in the open state. While the knee meat scraper device is in the open state, the knee joint of the leg product is arranged between the knee cap scraper and the counter element. Then, the knee meat scraper device is transferred from the open state to the closed state. This brings the knee cap with the knee meat thereon in the right starting position for the scraping of the knee meat from the knee cap. The scraping is started when the scraping motion device starts moving the drumstick and the knee cap scraper away from each other. During the scraping, the knee cap scraper and the counter element of the knee meat scraper device may generally maintain their position relative to each other, so they generally remain in the relative position they have in the closed state of the knee meat scraper device. Alternatively, during the scraping the counter element remains in a stationary position relative to the knee cap and the knee cap scraper moves relative to the counter element.

The knee meat and thigh meat harvester device of the system according to the invention optionally further comprises a drumstick-knee cap separator. This drumstick-knee cap separator is adapted and arranged to sever the knee cap from the drumstick after the knee meat has been scraped off the knee cap. The drumstick-knee cap separator is further adapted and arranged to make a cut at a first cutting location. The first cutting location is situated between the knee cap and the drumstick. The knee cap is severed from the drumstick after the knee meat has been scraped off the knee cap. The drumstick-knee cap separator being adapted and arranged to sever the knee cap from the drumstick for example involves arranging it at a suitable distance from the poultry products conveyor.

The knee meat and thigh meat harvester device optionally further comprises a knee cap-thigh separator. The knee cap-thigh separator is adapted and arranged to sever the knee cap from the thigh and the knee meat. The severing takes place after the knee meat has been scraped from the knee cap. The knee cap-thigh separator is further adapted and arranged to make a cut at a second cutting location. The second cutting location is situated between the knee cap and the thigh, adjacent to the knee cap scraper. During the severing of the knee cap from the thigh and the knee meat, the knee meat and the thigh, in particular the knee meat and the thigh meat, remain interconnected. The knee cap-thigh cap separator being adapted and arranged to sever the knee cap from the thigh for example involves arranging it at a suitable distance from the poultry products conveyor.

After the knee cap-thigh separator and the drumstick-knee cap separator have done their job, the knee cap is severed from the other parts of the leg product, so it can be harvested as a separate item. Optionally, the thigh, the knee cap and the drumstick are discharged separately from the system according to the invention. Optionally, the drumstick, the thigh and the knee cap from the same leg product are presented together to an inspector, inspection station or inspection system, to check whether the knee cap is severed in the right way.

It is possible to first sever the drumstick and the knee cap from each other and then the knee cap from the thigh and the knee meat. In that case, with the severing of the knee cap from the drumstick, the thigh and the drumstick are no longer connected to each other. As an alternative, it is possible to first sever the knee cap from the thigh (including the knee meat) from each other and then the drumstick and the knee cap. In that case, with the severing of the knee cap from the thigh and the knee meat, the thigh and the drumstick are no longer connected to each other. As a further alternative, it is possible to perform both severing actions simultaneously.

Severing the drumstick and the knee cap from each other before or at the same time as severing the knee cap from the thigh and knee meat has the advantage that it offers the opportunity to keep the connection between the thigh and the drumstick under tension during the action of severing the knee cap from the drumstick, which facilitates a controlled severing of the knee cap and the drumstick. This still does not inhibit a controlled severing of the knee cap from the thigh and the knee meat, as after the scraping, the knee cap is on the first side of the knee cap scraper and the thigh and the knee meat are on the second side of the knee cap scraper. By arranging the second cutting location adjacent to the knee cap scraper, the severing of the knee cap from the thigh and the knee meat can still take place in a controlled manner.

In a possible embodiment, the second cutting location is located on the second side of the knee cap scraper, so on the side of the knee cap. This way, the knee cap scraper shields the thigh and the knee meat from accidental damage by the knee cap-thigh separator when severing the knee cap from the thigh and knee meat. In an alternative embodiment, the second cutting location is located on the first side of the knee cap scraper, so on the side of the thigh and the knee meat.

In a possible embodiment, the knee meat and thigh meat harvester device further comprises a drumstick support element. The drumstick support element is adapted to support the drumstick, at least during the scraping step, when the drumstick and the knee meat scraper device are being moved away from each other. The drumstick support element is arranged and adapted to engage the drumstick at the drumstick side cut plane. This way, the drumstick is not or hardly subjected to forces that originate from the scraping of the knee meat from the knee cap. Preferably, the part of the drumstick support element that actually engages the drumstick side cut plane of the drumstick, extends substantially perpendicular to the direction in which the drumstick and the knee cap scraper move relative to each other during the scraping of the knee meat from the knee cap.

Optionally, the drumstick support element is arranged and adapted to engage the tibia bone when the drumstick and the knee meat scraper device are being moved away from each other. This way, the tibia bone is not or hardly subjected to forces during the scraping of the knee meat.

In a possible embodiment, the drumstick support element is a drumstick support plate. The drumstick support plate comprises a drumstick support surface which is arranged and adapted to engage the drumstick side cut plane of the drumstick during the scraping of the knee meat from the knee cap.

In a first variant of this embodiment, the drumstick is supported by a drumstick support surface on a first side of the drumstick support plate during the scraping. The knee joint and the thigh extend at an angle relative to the drumstick support surface, for example substantially perpendicular, from an edge of the drumstick support plate. The counter element and/or the knee meat scraper are arranged on the side of the drumstick support plate opposite to the drumstick support surface. Preferably, the knee cap is situated adjacent to and/or below the lateral side of the drumstick support plate opposite to the drumstick support surface.

In a second variant of this embodiment, the drumstick support plate comprises an aperture which extends through the drumstick support plate between the drumstick support surface and the side of the drumstick support plate opposite to the drumstick support surface. The aperture is for example a slot with one or two open ends. The aperture allows the drumstick to be arranged on the side of the drumstick support surface and the thigh to be arranged on the side of the drumstick support plate opposite to the drumstick support surface during the scraping. Preferably, the knee cap is situated adjacent to and/or below the lateral side wall of the aperture in the drumstick support plate. The knee joint and the thigh extend at an angle relative to the drumstick support surface, for example substantially perpendicular. During the scraping, the drumstick remains present on a first side of the drumstick support plate and the thigh remains present on the opposite side of the drumstick support plate. The counter element and the knee meat scraper are arranged on the side of the drumstick support plate opposite to the drumstick support surface.

In a possible embodiment, the scraping motion device comprises a scraper driver device that is adapted to move the knee cap scraper away from the drumstick in order to induce the scraping of the knee meat from the knee cap.

Optionally, the scraper driver device is adapted to also move the counter element away from the drumstick during the scraping of the knee meat from the knee cap, together with the knee cap scraper.

In a possible embodiment, the scraping motion device comprises a positioner driver device which is adapted to move the knee cap scraper and/or the counter element to engage the leg product and to bring the drumstick of said leg product into engagement with the drumstick support element prior to the scraping of the knee meat from the knee cap.

In a possible embodiment, before the knee meat scraper device is brought into a closed state, the counter element is arranged in or brought into a position adjacent to but at a distance from the drumstick side cut plane. This can be the position in which the counter element is in the open state of the knee meat scraper device. Then, the counter element is moved by the positioner driver device towards the drumstick until it engages the drumstick side cut plane. Then, the counter element is moved by the positioner driver device towards a predetermined drumstick reference position by the positioner driver device, taking the drumstick with it, preferably while the counter element remains in engagement with the drumstick side cut plane. The location of the drumstick reference position relative to the position of the knee cap scraper is known. As the knee cap is located close to the drumstick side cut plane and the position of the drumstick side cut plane is known when the drumstick side cut plane is in the drumstick reference position, the location of the knee cap relative to the knee cap scraper is also quite accurately known when the drumstick side cut plane is in the drumstick reference position.

This way, the counter element positions the drumstick and the knee cap in a reliable way relative to the knee cap scraper before the knee cap scraper engages the front side of the leg product adjacent to the knee cap on the drumstick side of the knee cap. Furthermore, the position of the drumstick side cut plane relative to the knee cap scraper is made independent of the length of the drumstick. Optionally, the drumstick reference position in which the counter element brings the drumstick side cut plane is a position in which the knee cap scraper engages the front side of the leg product adjacent to the knee cap on the drumstick side of the knee cap. In this variant, when the drumstick side cut plane is in the drumstick reference position, the knee meat scraper device is in its closed state.

In a variant of this embodiment, the counter element has a front side and a top side. In this variant, the counter element is also moved towards the rear side of the knee cap until it engages the rear side of the knee cap. Then, the counter element moves the knee joint of the leg product to an end-of-stroke position, preferably over a small distance. Then, the counter element is moved by the driver positioner device towards the drumstick side cut plane until the top side of the counter element engages the drumstick side cut plane. The top side of the counter element remains in engagement with the drumstick side cut plane and moves the drumstick side cut plane towards and into the drumstick reference position. The front side of the counter element remains in contact with the rear of the knee cap when the counter element is moved from the end-of-stroke position towards and into the drumstick reference position. Optionally, in this movement, the counter element moves back in a direction towards the rear side of the leg product.

In a possible embodiment, the counter element moves the knee joint to the end-of-stroke position, but not the drumstick side cut plane to the drumstick reference position.

In a possible embodiment, the scraper driver device and the positioner driver device are combined into a combined driver device which fulfills both functions. In such an embodiment, for example, both the knee cap scraper and the counter element are provided with a cam follower that is moveable through an associated knee cap scraper cam track or an associated counter element cam track, respectively. Via the respective cam track and cam follower, the knee cap scraper and the counter element make all the desired movements for bringing the drumstick of the leg product into engagement with the drumstick support element and performing the action of scraping the knee meat from the knee cap.

In a possible embodiment, the distance over which the drumstick and the knee cap scraper are moved relative to each other during the scraping step is adjustable. This way, the length of the scraping path is adjustable, allowing it to be matched to the expected size of the knee cap. By doing so, it is ensured that all knee meat is scraped from the knee cap, while at the same time the thigh meat is not damaged by the knee cap scraper.

In a possible embodiment, the distance between the drumstick support element (in particular the drumstick support plane thereof, if that is present) and the second cutting location is adjustable. This way, it is ensured that the second cutting location is such that no pieces of the knee cap remain attached to the knee meat, and also that as little as possible of the knee meat remains behind on the knee cap after severing the knee cap and the thigh. The distance can be chosen on the basis of the expected size of the knee cap.

The adjustment of the length of the scraping path and/or the distance between the drumstick support element and the second cutting location can be achieved in many ways. For example, the combined driver device and/or the scraper driver device can be adjustable, e.g. by providing an adjustable cam track, e.g. by using an exchangeable cam track part. The distance between the drumstick support element and the second cutting location can for example be adjusted by adjusting the position of the drumstick support element and/or the position of the knee cap-thigh separator, or by arranging shims or filler plates on the drumstick support element.

In a possible embodiment, the scraping motion device comprises a lifter which is adapted to move the drumstick relative to the knee cap scraper. The lifter is moveable between a retracted position and an extended position. The lifter is adapted and arranged to engage the drumstick during at least a part of the lifter's movement from the retracted position to the extended position. During at least a part of the lifter's movement from the retracted position to the extended position, the lifter moves the drumstick away from the knee cap scraper and the counter element, in order to effect the scraping of the knee meat from the knee cap.

Optionally, the lifter is adapted and arranged to support, optionally to engage, the tibia bone during at least a part of the lifter's movement from the retracted position to the extended position. By doing this, the tibia bone is subjected to compression forces during the scraping of the knee meat. The tibia bone is the strongest in this direction, so in this embodiment the tibia bone is in the optimal situation to bear the mechanical loads exerted on it during the scraping of the knee meat from the knee cap.

It is possible that that lifter simultaneously with the moving of the drumstick relative the knee cap scraper acts as a drumstick support element.

In a possible embodiment, the scraping motion device comprises a track part that is integrated in the track of the poultry products conveyor. This track part has a first end and a second end, which second end is downstream of the first end seen in the direction of conveyance. The distance of the first end of the track part to the counter element and the knee cap scraper is smaller than the distance of the second end of the track part to the counter element and the knee cap scraper.

When a poultry product carrier runs through this track part from the first end to the second end thereof, the poultry product carrier gradually moves away (for example upward) relative to the counter element and the knee cap scraper of the knee meat scraper device, and therewith also the drumstick that is held by the poultry product carrier moves away from the counter element and the knee cap scraper of the knee meat scraper device. Thereby scraping of the knee meat from the knee cap is induced.

In a possible embodiment, the knee cap scraper and the counter element are moveable relative to each other to perform a scissors-like cutting operation and therewith act as the knee cap-thigh separator. In this embodiment, preferably at least one of the knee cap scraper and the counter element is provided with a sharp edge.

In a possible embodiment, at least knee meat and thigh meat harvester device is arranged in a carrousel machine. In the carrousel machine, the one or more knee meat and thigh meat harvester devices move along with a leg product that undergoes the method according to the invention. In a carrousel machine, the processing devices are mounted to be movable along a circular or other loop-shaped path, e.g. an elliptical path or a path made up out of a combination of straight lines and curves.

The invention will be described in more detail below under reference to the drawing, in which in a non-limiting manner exemplary embodiments of the invention will be shown.

Figure 1A:
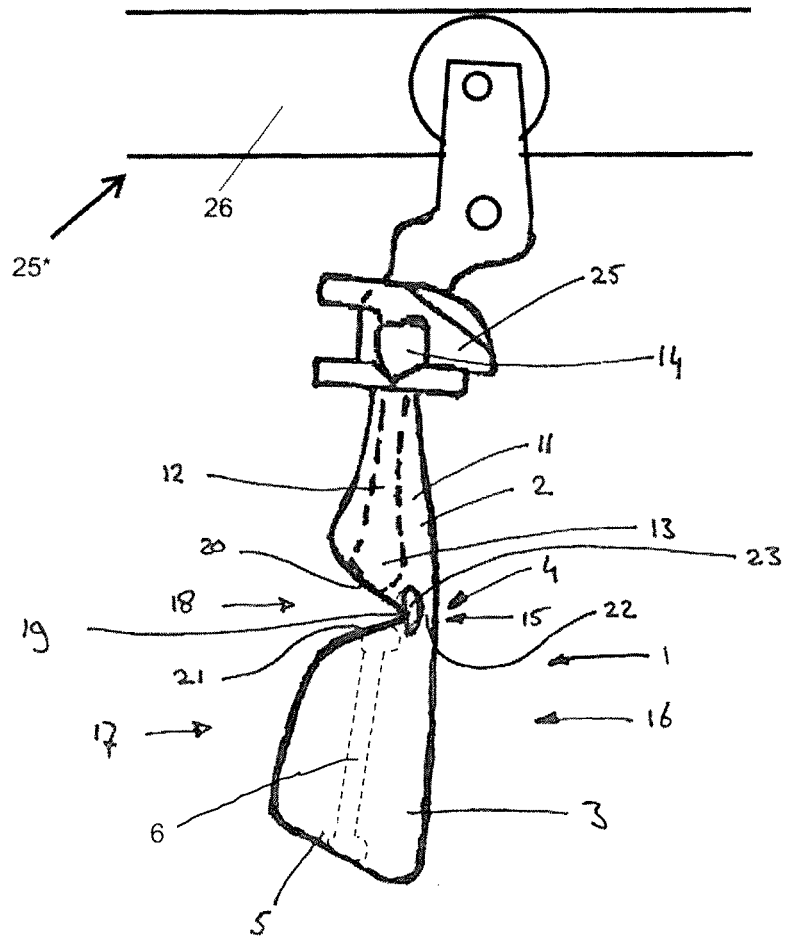
Figure 2:
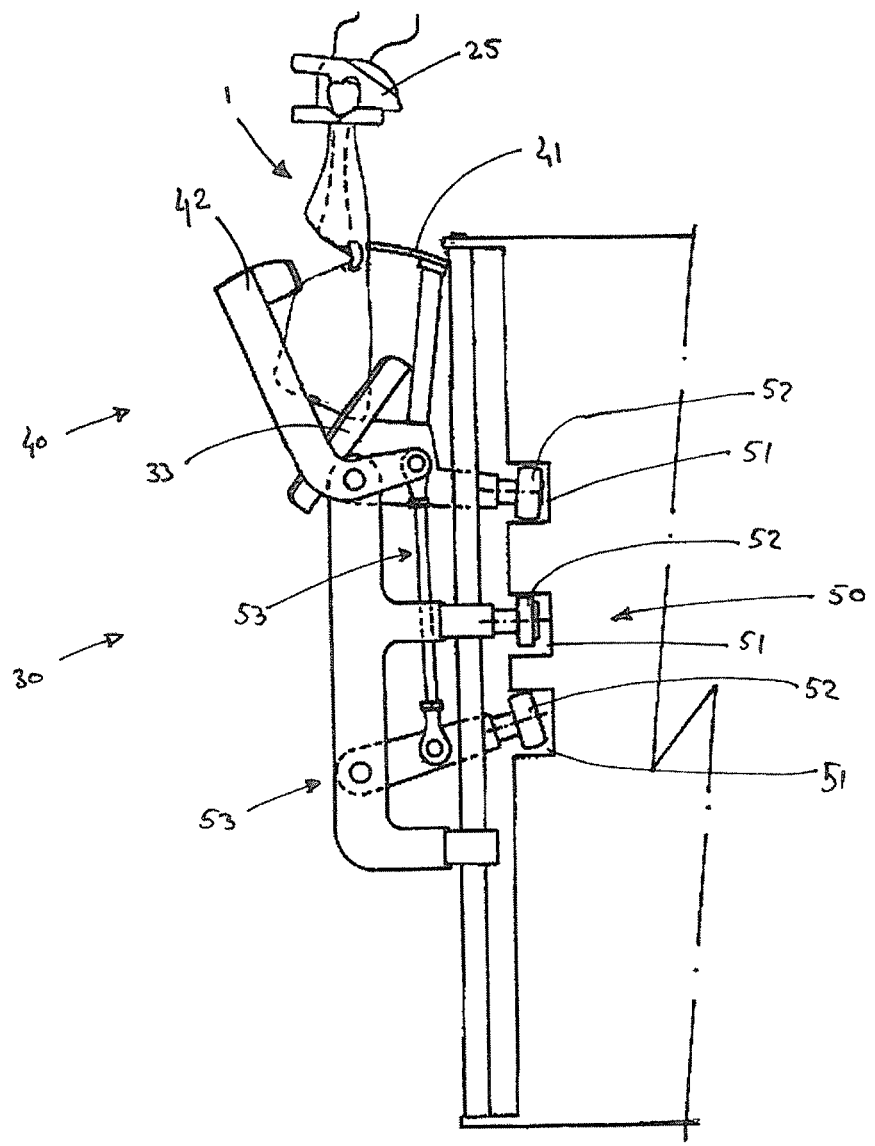
Figure 3:
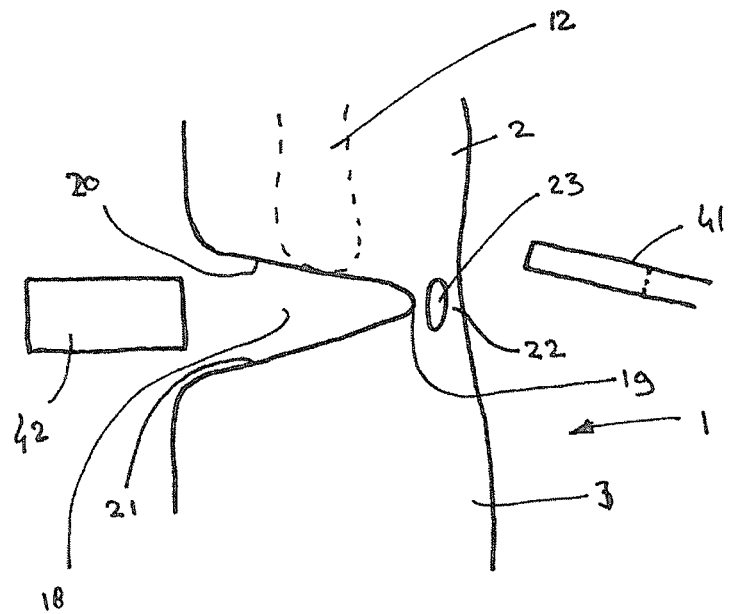
Figure 4:
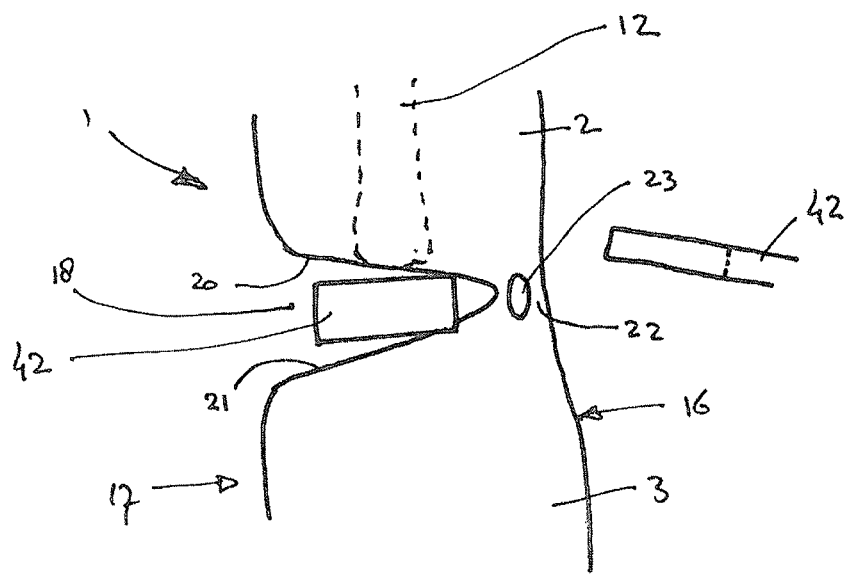
Figure 5:
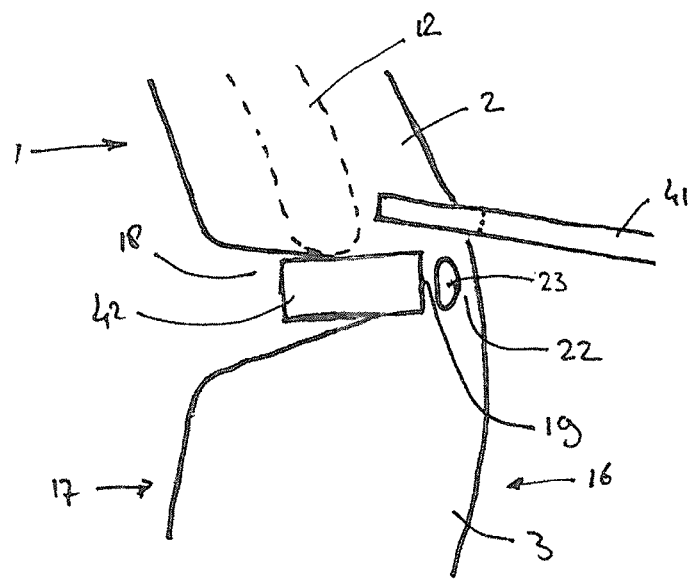
Figure 6:
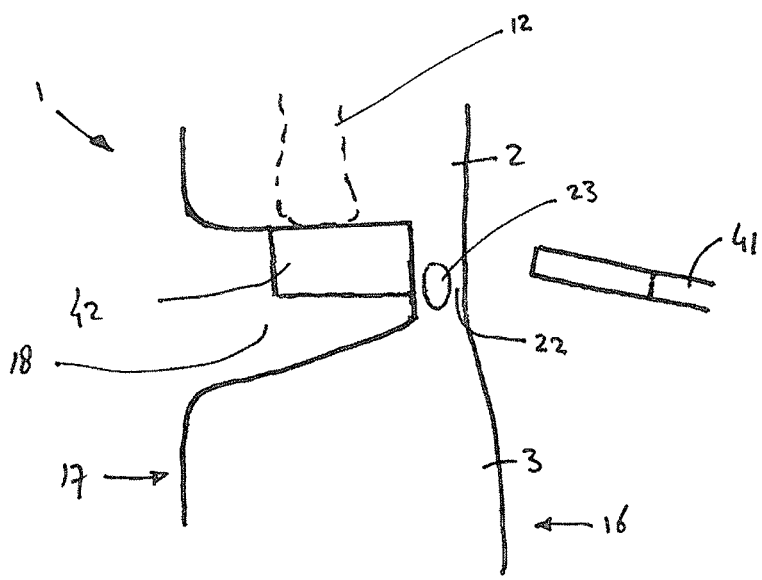
Figure 7:
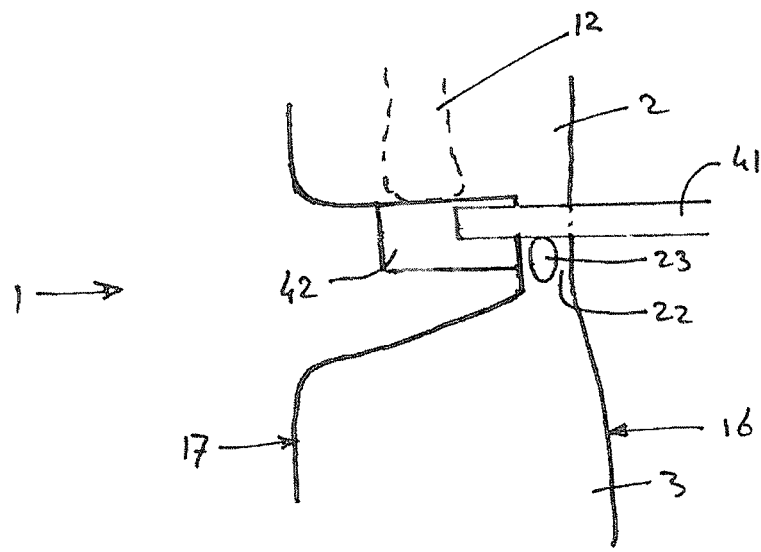
Figure 8:
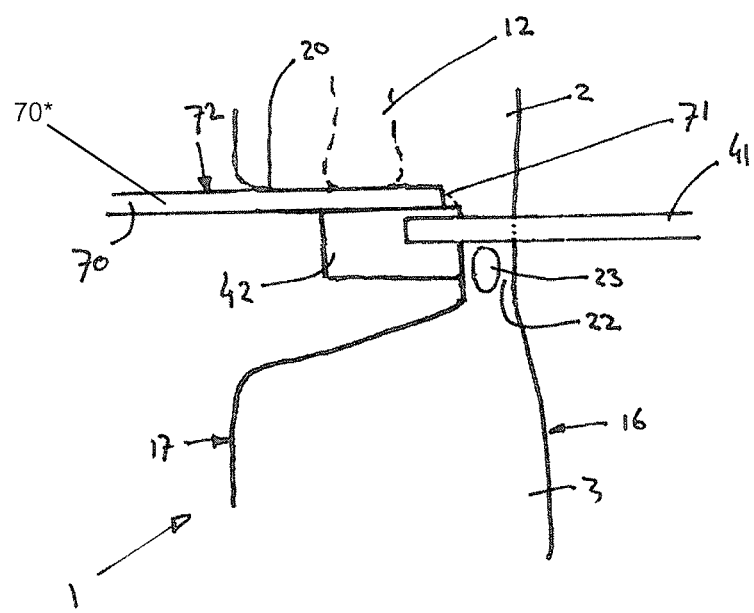
Figure 8A:
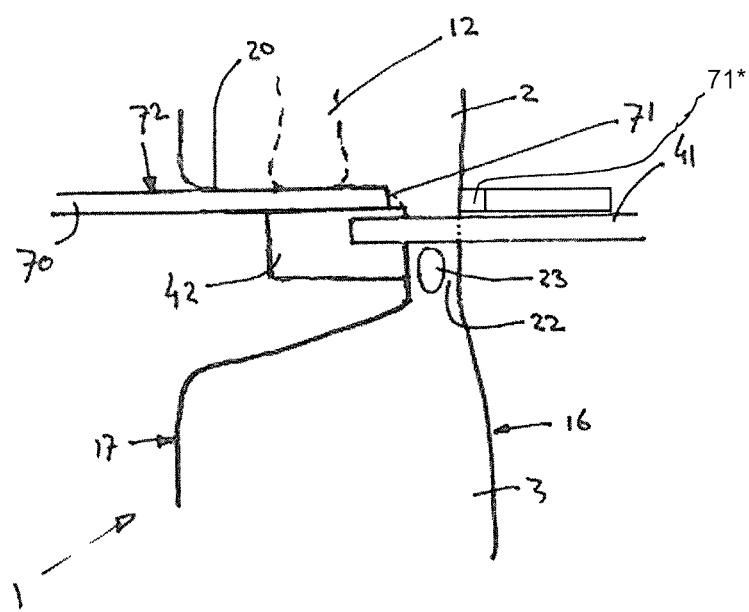
Figure 9:
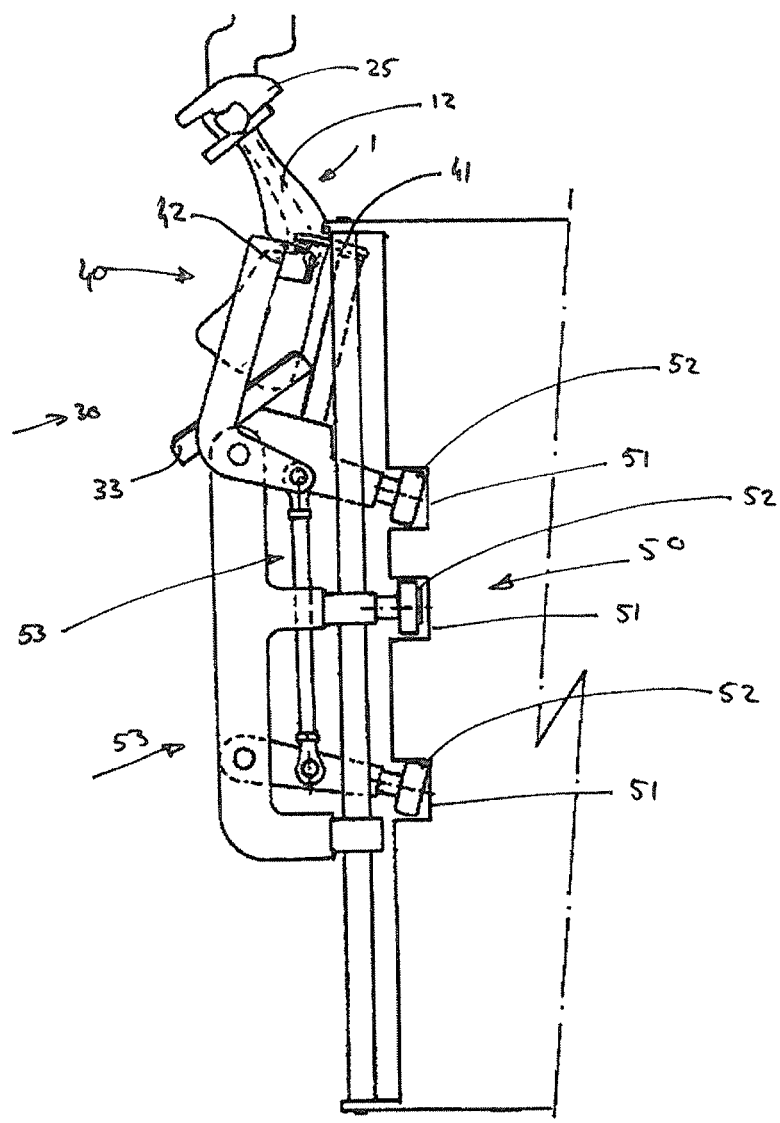
Figure 10:
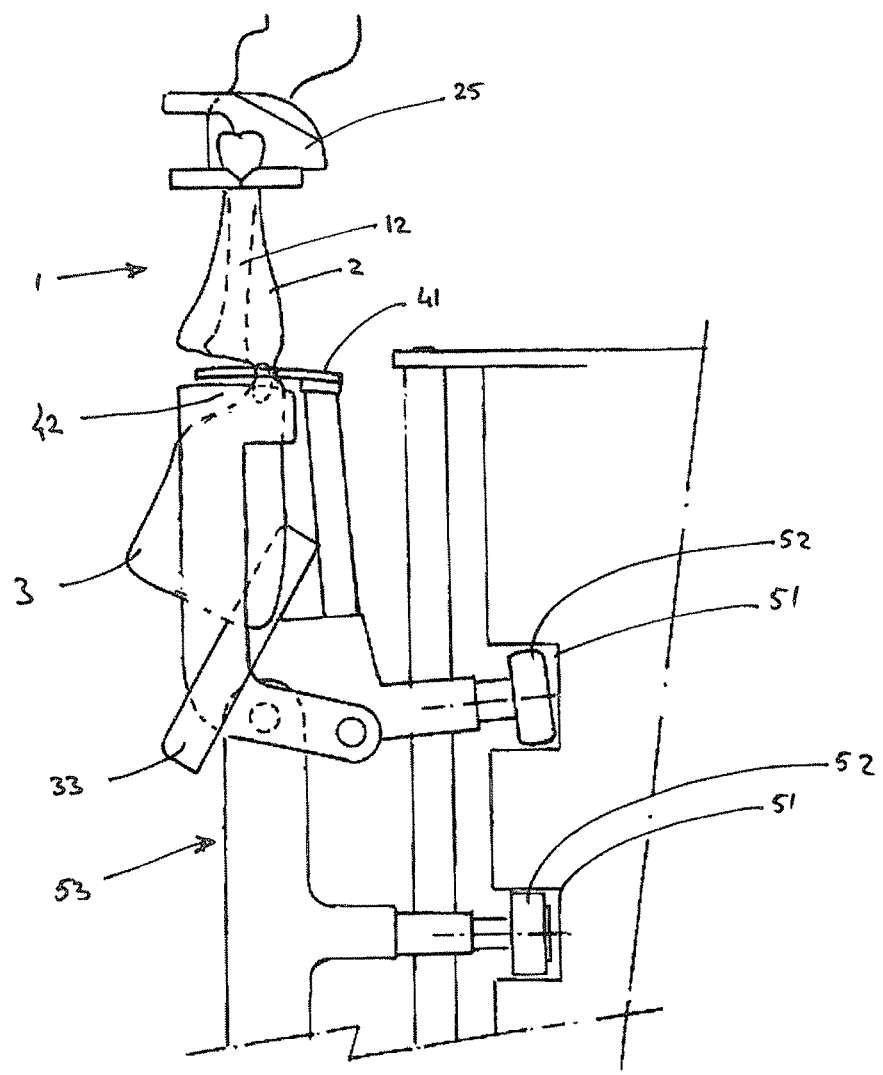
Figure 11:
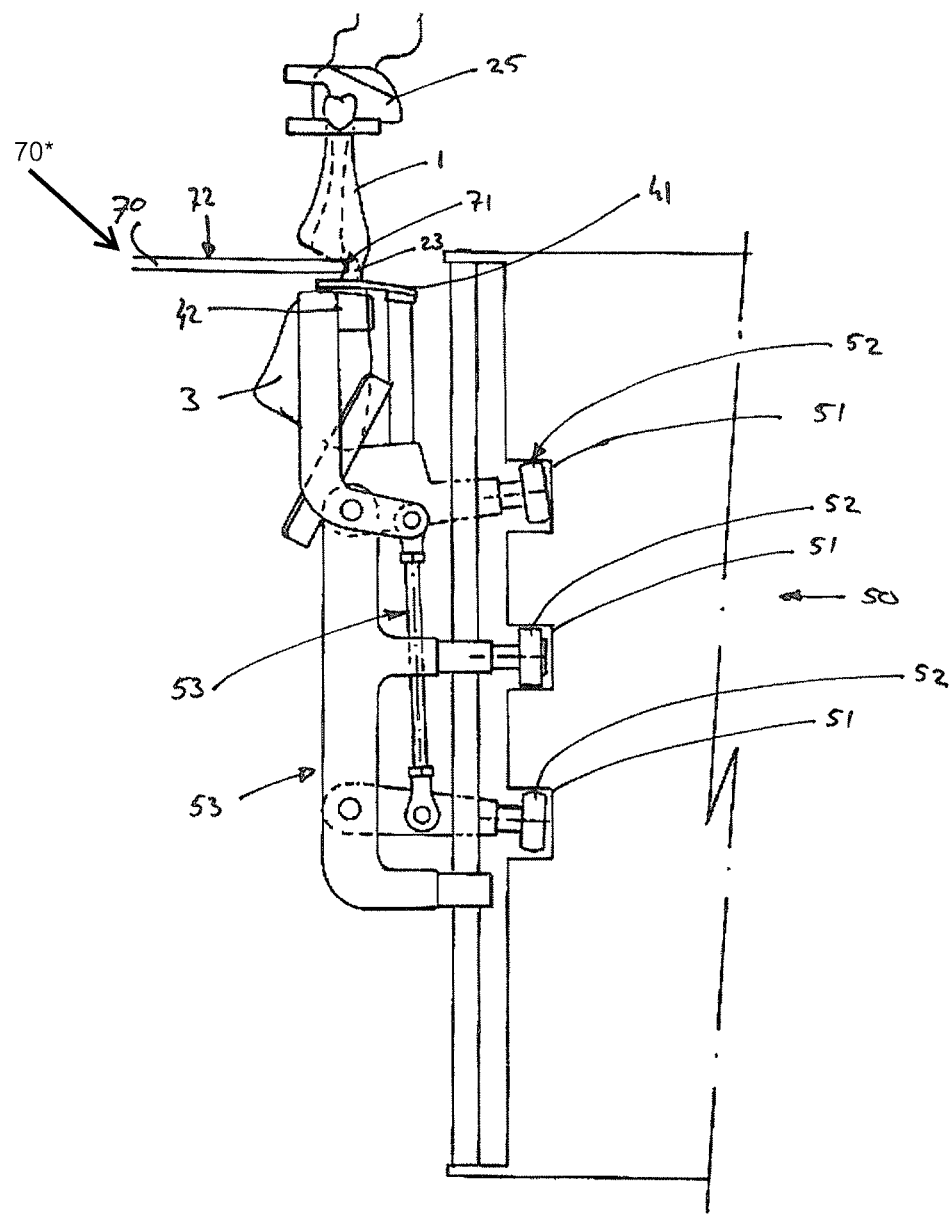
Figure 12:
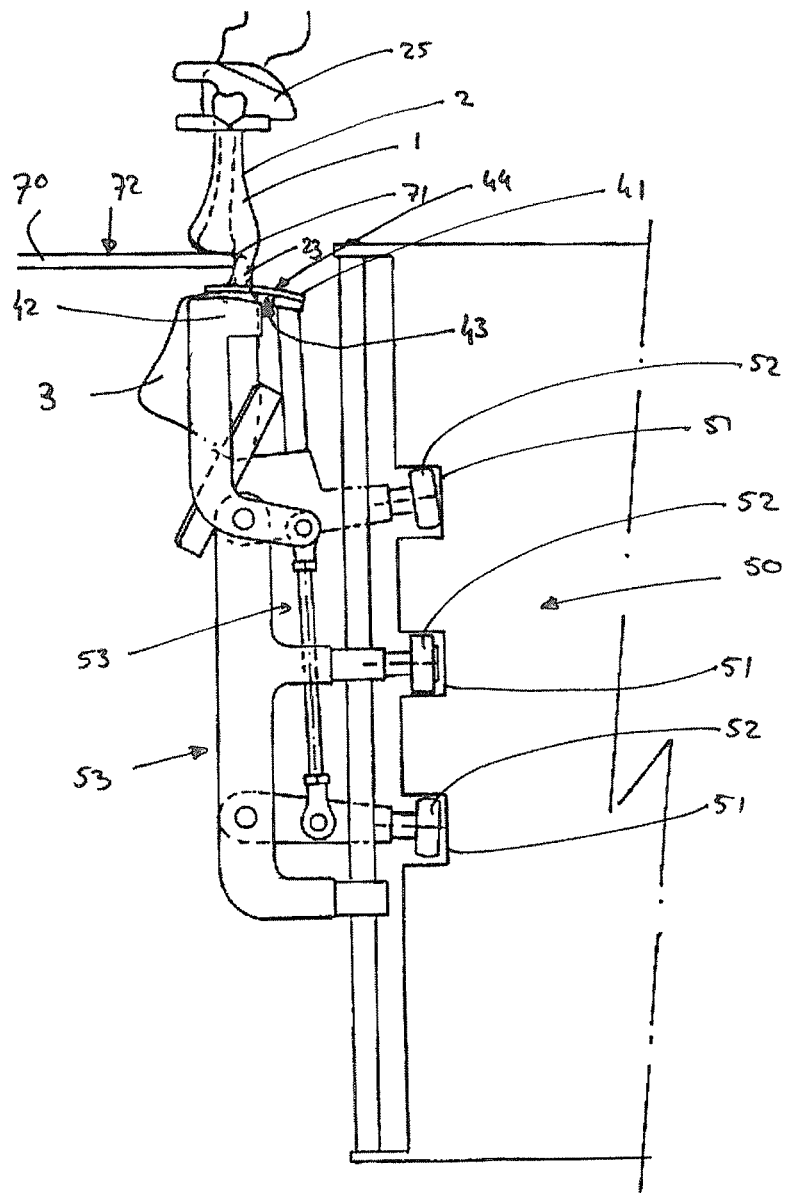
Figure 13:
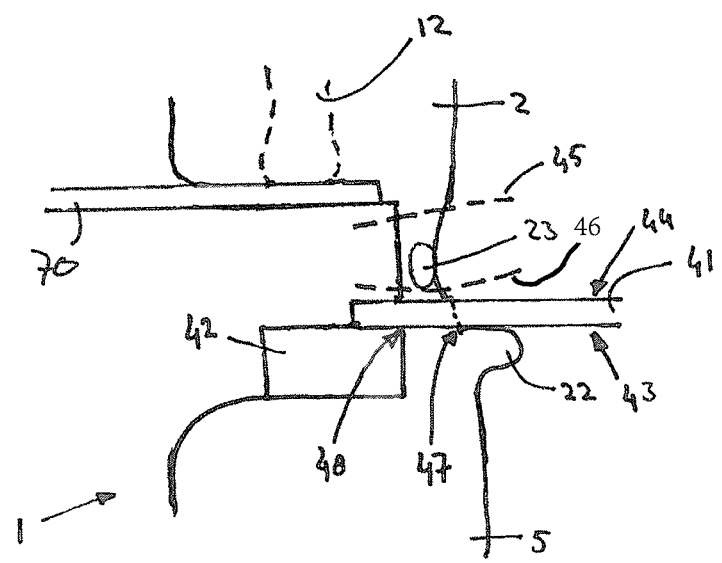
Figure 14:
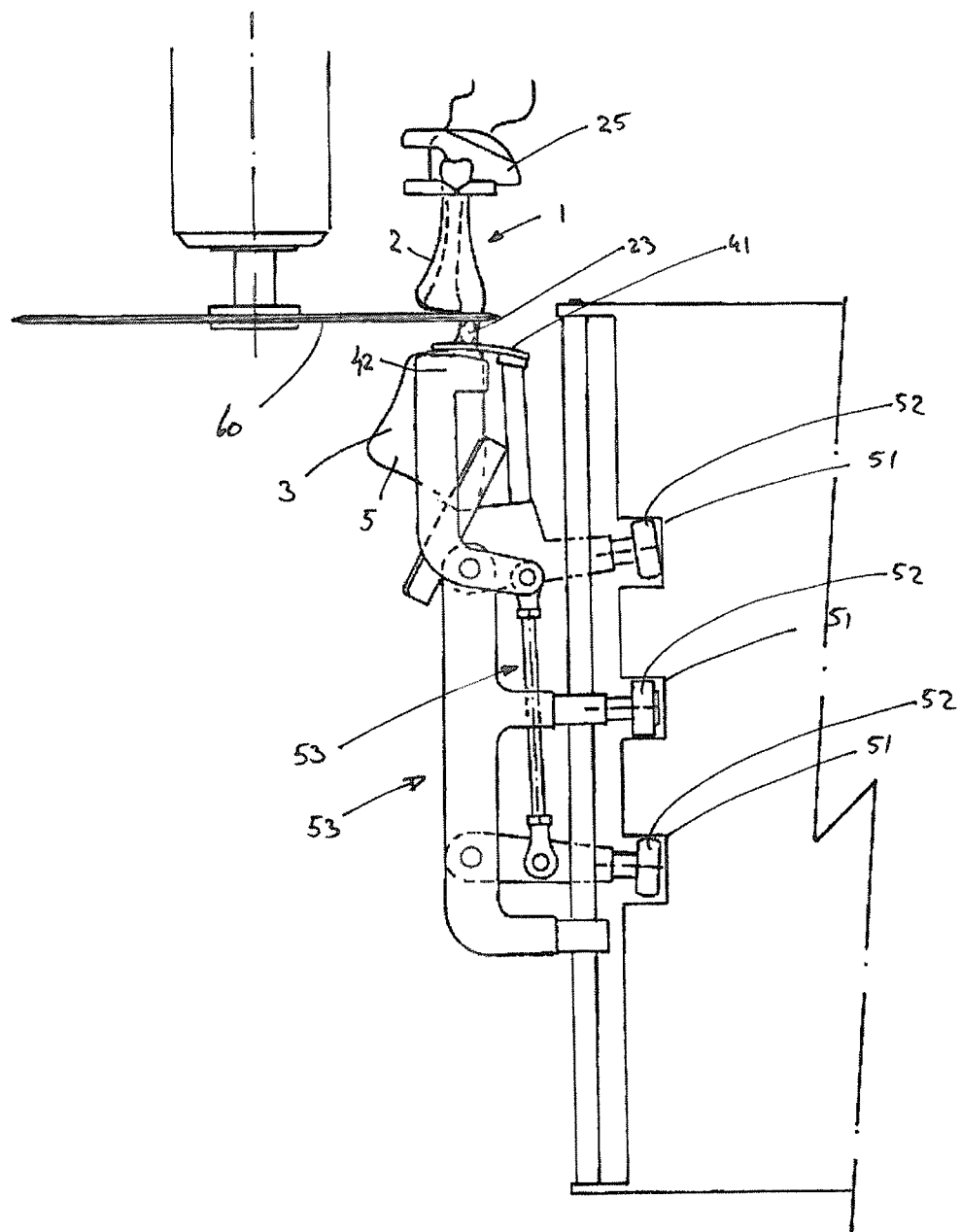
Figure 15:
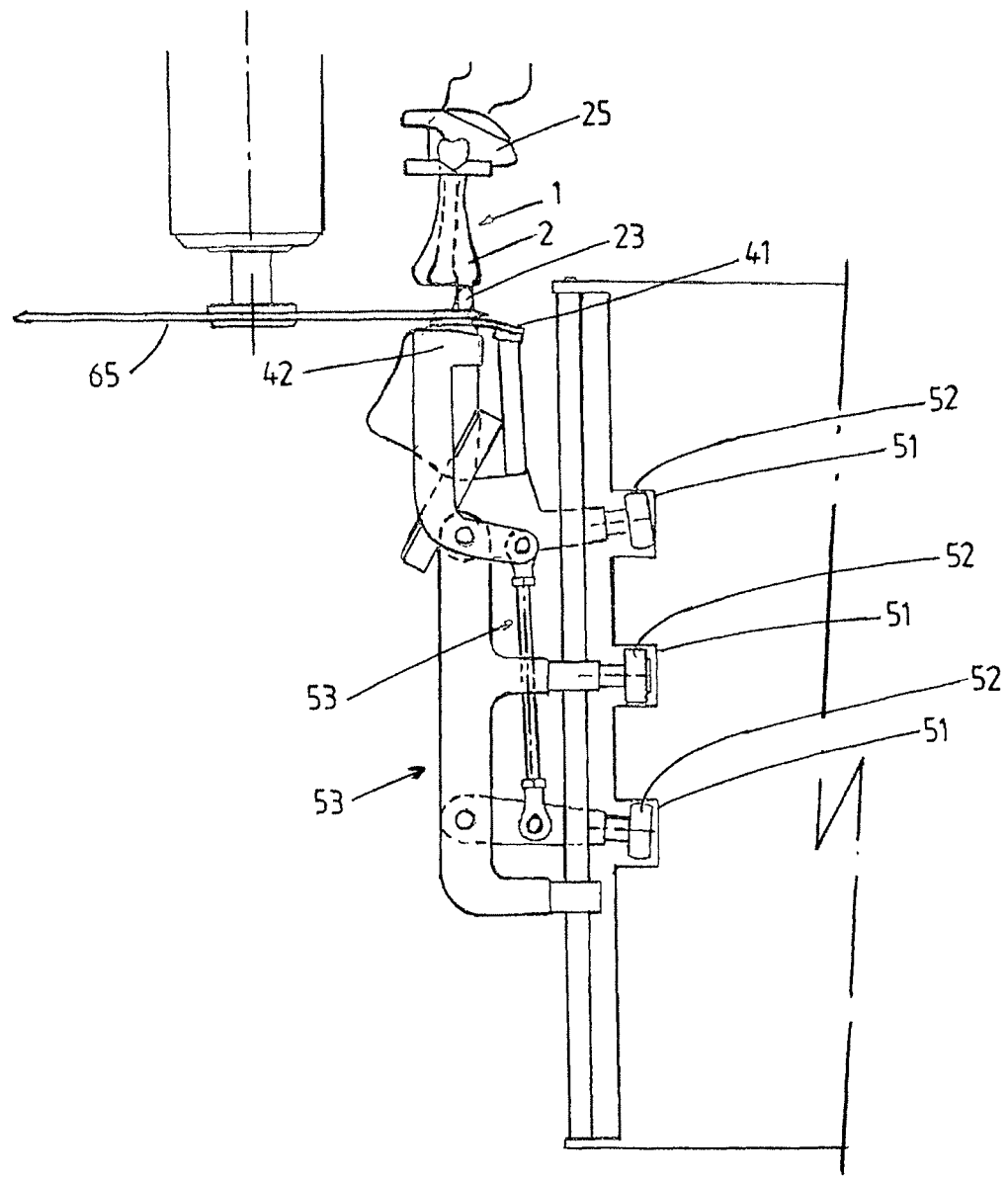
Figure 16:
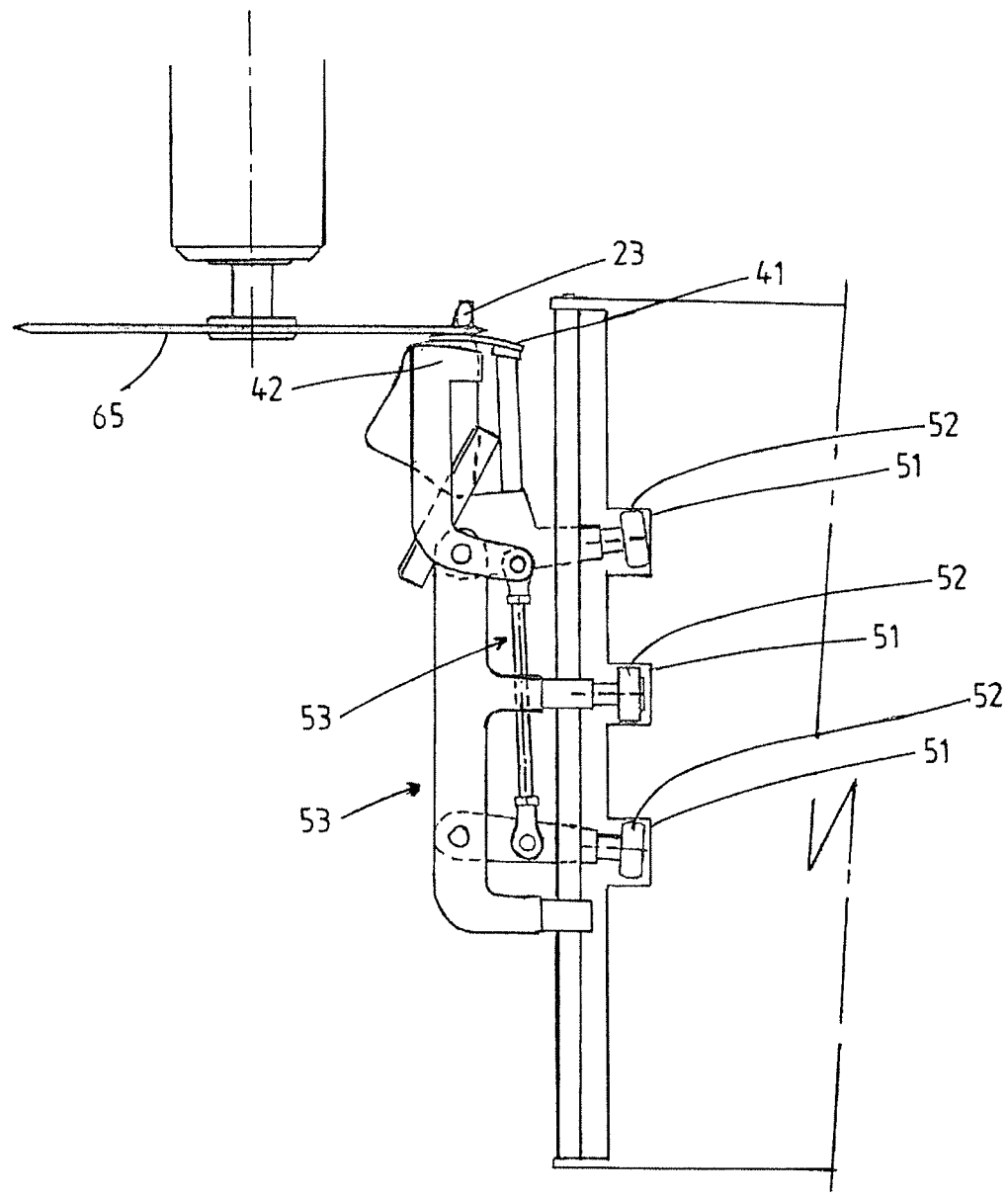
Figure 17:
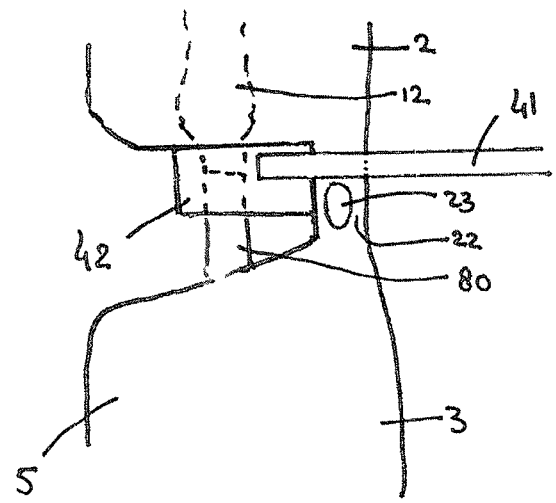
Figure 18:
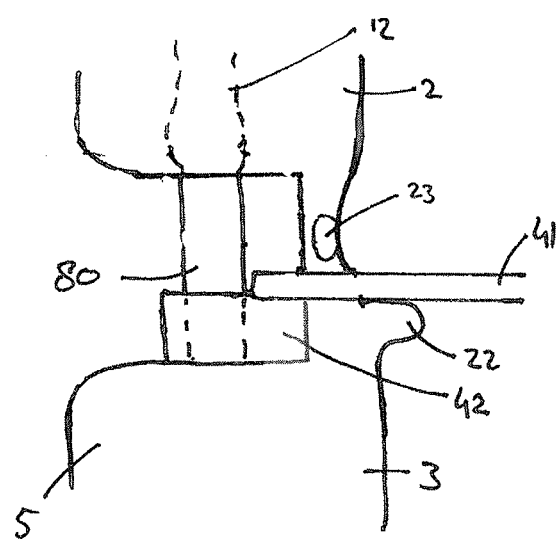
Figure 19:
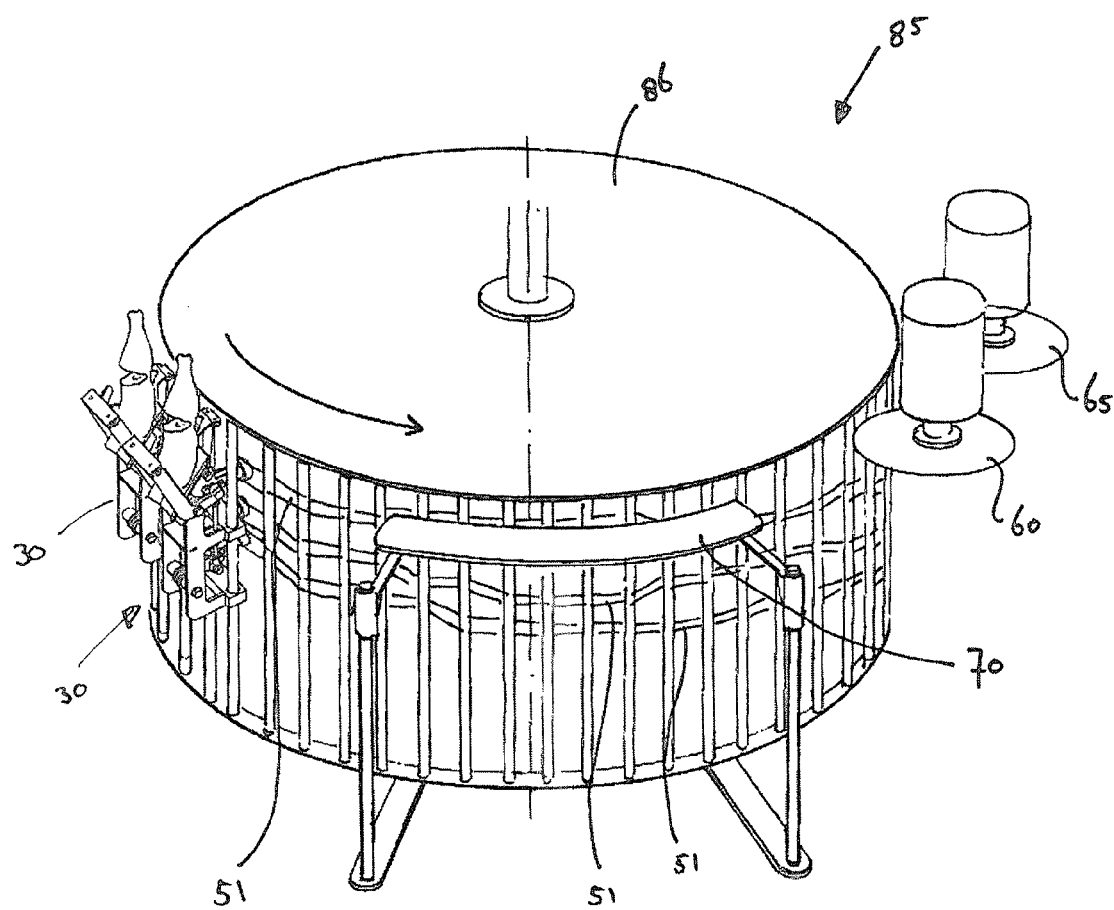
Figure 20:
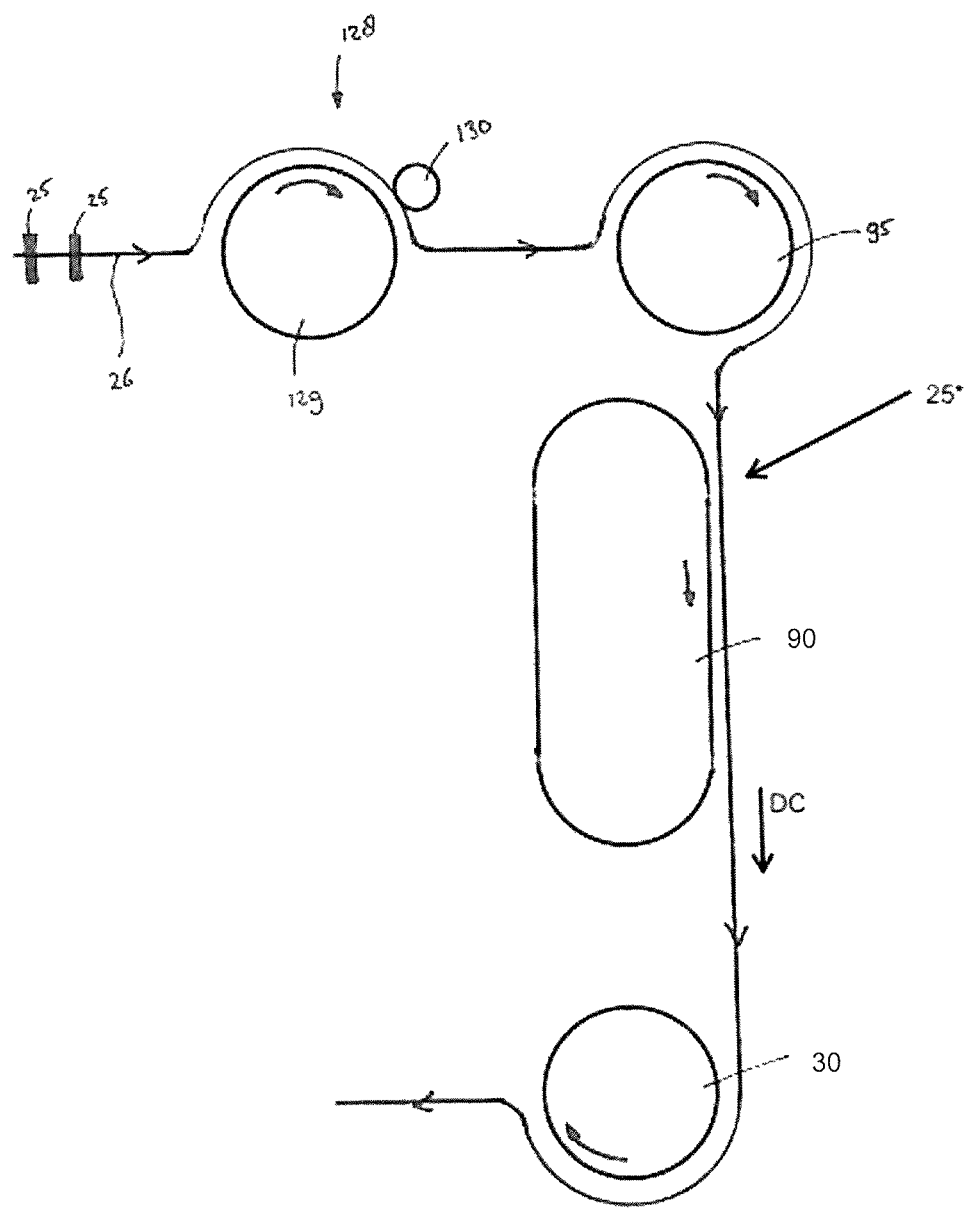

In the drawings:

FIG. 1: shows a defeathered whole leg poultry product as it is provided in the first step of the exemplary embodiment of the method according to the invention that is shown in FIG. 1-16, FIG. 1A: shows an embodiment in which a thigh bone is still present, FIG. 2: shows a knee meat and thigh meat harvester device, FIG. 3: shows the initial position of the counter element and the knee cap scraper relative to the leg product, in particular relative to the transverse cut 18 at the knee joint, FIG. 4: shows a subsequent stage of the positioning, FIG. 5: shows that the counter element moves forward further towards and into an end-of-stroke position, FIG. 6: shows that the counter element moves from the end-of stroke position in the direction towards the drumstick side cut plane to a drumstick reference position, FIG. 7: shows that the knee cap scraper is brought into engagement with the front side of the leg product, adjacent to the knee cap on the side of the drumstick, FIG. 8: shows that the drumstick side cut plane is arranged onto a drumstick support element, FIG. 8A: shows an alternative embodiment, in which an aperture is provided in the drumstick support plate through which the knee cap and the connection between the drumstick and the thigh hang down, FIG. 9: shows the leg product and the knee meat and thigh meat harvester device of FIG. 2 in the stage of FIG. 5, FIG. 10: shows the leg product and the knee meat and thigh meat harvester device of FIG. 2 in the stage of FIG. 7, FIG. 11 shows the situation after a part of the scraping of the knee meat from the knee cap, FIG. 12: shows that most of the knee meat has been scraped off the knee cap, FIG. 13: shows a subsequent stage in the exemplary embodiment of the method according to the invention, FIG. 14: shows a drumstick-knee cap separator, FIG. 15: shows a knee cap-thigh separator, FIG. 16: shows the situation in the exemplary embodiment of the system according to the invention in which first the drumstick is severed from the knee cap and then the knee cap is severed from the interconnected thigh meat and knee meat, FIG. 17: shows an alternative embodiment of the scraping motion device, with a lifter 80 in a retracted position, FIG. 18: shows the alternative embodiment of the scraping motion device of FIG.17, with the lifter in an extended position, FIG. 19: illustrates a plurality of knee meat and thigh meat harvester devices arranged in a carrousel machine, FIG. 20 shows a schematic top view of an exemplary embodiment of a system in which the system according to the invention is used.

FIG. 1-16 serve to illustrate subsequent stages of an exemplary embodiment of the method according to the invention which is carried out in an embodiment of a system according to the invention.

FIG. 1 shows a defeathered whole leg poultry product 1 ("leg product 1") as it is provided in the first step of the exemplary embodiment of the method according to the invention that is shown in FIG. 1-16. The leg product 1 comprises a thigh 3, a drumstick 2 and a knee joint 4.

The thigh 3 comprises thigh meat 5. In the embodiment shown in FIG. 1-16, the thigh bone has been removed prior to carrying out the method according to the invention. In different embodiments however, a thigh bone 6 may still be present in the thigh, as is shown in FIG. 1A.

The drumstick 2 comprises a tibia bone 12 and drumstick meat 11. The tibia bone 12 has a knee side 13 end and a tarsal joint side end 14.

The knee joint 4 comprises at least knee meat 22, the knee cap 23 and a connection 15 between the thigh 3 and the drumstick 2.

The leg product 1 has a front side 16, which is the side on which the knee cap 23 is located, and a rear side 17, which is the side opposite to the front side 16.

In the leg product 1, a transverse cut 18 has been provided at the knee joint. The transverse cut 18 extends generally in a direction transverse to the tibia bone 12, and from the rear side 17 of the leg product 1 to a cut end 19 which is located adjacent to the rear side of the knee cap 23 so that the thigh 3 and the drumstick 2 are still connected to each other and the knee cap 23 is still intact. By the transverse cut 18, a drumstick side cut plane 20 and a thigh side cut plane 21 are created. They are connected to each other adjacent to the cut end 19.

The leg product 1 is arranged in a poultry product carrier 25 of a poultry products conveyor 25*. The leg product 1 is suspended from said poultry product carrier 25. The poultry product carrier 25 engages the leg product 1 at or adjacent to the tarsal joint side end 14 of the tibia bone 12.

The poultry products conveyor 25* comprises a track 26 and a plurality of poultry product carriers 25. The poultry product carriers 25 are spaced apart from one another in the direction of the track 26 and are movable along said track 26.

The system of FIG. 1-16 further comprises a knee meat and thigh meat harvester device 30, which is shown in FIG. 2. The knee meat and thigh meat harvester device 30 is arranged along the track of the poultry products conveyor.

The knee meat and thigh meat harvester device 30 comprises a knee meat scraper device 40, a scraping motion device 50, a drumstick-knee cap separator 60 (see FIG. 14) and knee cap-thigh separator 65 (see FIG. 15).

The knee meat scraper device 40 comprises a knee cap scraper 41 and a counter element 42.

The counter element 42 is arranged at a distance from the track of the poultry products conveyor that enables to arrange the leg product 1 adjacent to the counter element 42, with the drumstick side cut plane 20 facing the counter element 42 while the leg product 1 is suspended from the poultry product carrier 25 of the poultry products conveyor.

The knee meat scraper device 40 has an open state and a closed state. In the open state the knee cap scraper 41 and the counter element 42 are spaced apart from each other, allowing the knee joint 4 of the leg product 1 to be introduced between the knee cap scraper 41 and the counter element 42. FIG. 2 shows the knee meat scraper device 40 in the open state.

In the embodiment shown in FIG. 1-16, the a knee meat and thigh meat harvester device 30 further comprises a thigh support 33 that prevents an undesired amount of movement of the leg product 1 relative to the a knee meat and thigh meat harvester device 30. The thigh support 33 is an optional feature.

FIG. 3-8 show subsequent stages in the exemplary embodiment of the method according to the invention.

In these stages of the exemplary embodiment of the method according to the invention, the drumstick and the knee cap are positioned relative to the knee cap scraper 41.

FIG. 3 shows the initial position of the counter element 42 and the knee cap scraper 41 relative to the leg product 1, in particular relative to the transverse cut 18 at the knee joint.

FIG. 4 shows a subsequent stage of the positioning. Now, the counter element 42 is moved forward (that is in a direction from the rear side 17 of the leg product 1 towards the front side 16 of the leg product 1) relative to the leg product 1. The counter element 42 herewith enters into the transverse cut 18 between the drumstick side cut plane 20 and the thigh side cut plane 21.

FIG. 5 shows that then, the counter element 42 then moves forward further towards and into an end-of-stroke position. The location of the end-of-stroke position of the counter element 42 is chosen such that the counter element 42 in normal cases, when the system is functioning properly, always engages the leg product 1 at or adjacent to the cut end 19, which is located adjacent to the rear side of the knee cap 23. This is achieved by arranging the end-of-stroke location somewhat in front of the expected location of the cut end 19, so that the counter element 42 practically always will move the leg product 1 a bit to the front (wherein "the front" is on the same side as "the front side 16 of the leg product" as defined before).

As in the end-of-stroke position the counter element 42 engages the leg product at or adjacent to the cut end 19, which is located adjacent to the rear of the knee cap 23, the position of the knee cap 23 in the direction generally transverse to the tibia bone 12 is quite accurately known in this stage of the process. Optionally, the knee cap scraper 41 engages the leg product in the end-of-stroke position.

Optionally, the counter element 42 moves from the end-of stroke position in the direction towards the drumstick side cut plane 20 to a drumstick reference position. This is shown in FIG. 6. In the drumstick reference position, the counter element 42 engages the drumstick side cut plane 20 and preferably moves the drumstick 2 somewhat in this direction too. By doing this, the position of the drumstick side cut plane 20 and of the knee cap 23 (which is located close to the drumstick side cut plane 20) is also quite accurately known in the direction generally parallel to the tibia bone 12.

Optionally, the drumstick reference position lies to the rear of the end-of-stroke position, as is shown in FIG. 5. In that case, the counter element 42 preferably moves the leg product back to the rear again when the counter element 42 moves towards and into the drumstick reference position.

Optionally, the counter element 42 is pivoted from the initial position that is shown in FIG. 3 towards and into the end-of stroke position that is shown in FIG. 5, and then pivoted from the end-of-stroke position towards and into the drumstick reference position.

FIG. 9 shows the leg product 1 and the knee meat and thigh meat harvester device 30 of FIG. 2 in the stage of FIG. 5.

Then, as FIG. 7 shows, the knee cap scraper 41 is brought into engagement with the front side of the leg product 1, adjacent to the knee cap 23 on the side of the drumstick 2.

When the knee cap scraper 41 is in this position and the counter element 42 engages the leg product 1 at or adjacent the rear of the knee cap 23, the knee meat scraper device is in its closed state.

The knee cap scraper 41 can be brought in this position when the counter element 42 is at the end-of-stroke position or when the counter element 42 is in the drumstick reference position. When the knee cap scraper 41 is brought in this position while the counter element 42 is in the end-of-stroke position, and the counter element 42 is then moved to the drumstick reference position, the knee cap scraper preferably moves along with the counter element 42 and the leg product during this movement.

FIG. 10 shows the leg product 1 and the knee meat and thigh meat harvester device 30 of FIG. 2 in the stage of FIG. 7.

In the subsequent stage of the exemplary embodiment of the invention, which is shown in FIG. 8, the drumstick side cut plane 20 is arranged onto a drumstick support element 70*, which in this embodiment is a drumstick support plate 70. The drumstick support plate 70 slides between the drumstick side cut plane 20 and the counter element 42.

The knee cap 23 and the connection between the drumstick 2 and the thigh 3 hang over the edge 71 of the drumstick support plate. In an alternative embodiment, an aperture 71* is provided in the drumstick support plate 70 through which the knee cap 23 and the connection between the drumstick 2 and the thigh 3 hang down, as is shown in FIG. 8A.

The drumstick support plate 70 has a drumstick support surface 72 that engages the drumstick side cut plane 20 and preferably also the tibia bone 12.

In this stage of the method, the counter element 42 and the knee cap scraper 41 engage the leg product 1. The counter element 42 engages the leg product 1 adjacent to the rear side of the knee cap 23 and the knee cap scraper 41 engages the front side of the leg product 1 adjacent to the knee cap on the drumstick side of the knee cap.

In the embodiment shown in FIG. 2 and FIG. 9-14, a scraping motion device 50 is provided that comprises cam tracks 51, cam followers 52 and motion transfer linkages 53 that transfer the movement of the cam followers 52 to the knee cap scraper 41 and the counter element 42. In the current embodiment, the cam tracks 52 are designed to control the movement of the counter element 42 to and from the end-of-stroke position and to and from the drumstick reference position as well as the movements of the counter element 42 and the knee cap scraper 41 during the scraping of the knee meat 22 from the knee cap 23. The cam tracks 51, cam followers 52 and motion transfer linkages 53 together fulfill the functions of both the scraper driver device and the positioner driver device.

Now, while the drumstick is supported by the drumstick support plate 70, the scraping of the knee meat 22 from the knee cap can commence. FIG. 11 shows the situation after a part of the scraping of the knee meat from the knee cap, while in FIG. 12, most of the knee meat has been scraped off the knee cap.

To effect this scraping, the knee meat and thigh meat harvester 30 is provided with a scraping motion device 50, that is adapted to cause a relative movement of the drumstick 2 and the knee cap scraper 40 away from each other.

The scraping motion device 50 moves the knee cap 23 past the knee cap scraper 41 while the counter element 42 engages the leg product 1 at or adjacent to the rear side of the knee cap 23, thereby inducing the scraping of the knee meat 22 from the knee cap 23 while leaving the knee meat 22 connected to the thigh 3. After the scraping the knee meat 22 and thigh meat 5 are present on a first side 43 of the knee cap scraper 41 and the knee cap 23 on a second side 44 of the knee cap scraper 41.

In this embodiment, the knee cap 23 is moved past the knee meat scraper 41 by moving the knee cap scraper 41 and the counter element 42 relative to the knee cap 23. The knee cap 23 remains stationary, and the knee cap scraper 41 and the counter element 42 are moved by the scraping motion device 50.

By this action, the knee meat 22 is scraped off of the knee cap 23. The knee meat 23 however remains connected to the thigh meat 5.

FIG. 13 shows a subsequent stage in the exemplary embodiment of the method according to the invention.

Now, the knee meat 22 has been severed from the knee cap 23, but the knee cap is still attached to the thigh 3 and to the drumstick 2. The knee meat 22 is still connected to the thigh meat 5.

In the exemplary embodiment shown, the counter element 42 has moved along with the knee cap scraper 41 relative to the knee cap 23. The drumstick 2, and the tibia bone 12 have been supported by the drumstick support plate 70 during the scraping and are still supported by it in the stage of the exemplary embodiment of the method according to the invention shown in FIG. 13.

Now, in the exemplary embodiment shown here, the leg product 1 is still to be divided into three parts: the drumstick, the knee cap and the thigh (with the knee meat connected to the thigh). This requires severing the drumstick and the knee cap from each other and severing the knee cap and the thigh (including the knee meat 22 that is interconnected with the thigh) from each other.

It is possible to first sever the drumstick 2 and the knee cap 23 from each other and then the knee cap 23 from the thigh 5 and the knee meat 22. In that case, with the severing of the knee cap 23 from the drumstick 2, the thigh 3 and the drumstick 2 are no longer connected to each other. As an alternative, it is possible to first sever the knee cap 23 from the thigh 3 (including the knee meat 22) from each other and then the drumstick 2 and the knee cap 23. In that case, with the severing of the knee cap 23 from the thigh 3 and the knee meat 22, the thigh 3 and the drumstick 2 are no longer connected to each other. As a further alternative, it is possible to perform both severing actions simultaneously.

The severing of the knee cap and the drumstick can be done in an automated way by a device or manually. The severing of the knee cap and the thigh can be done in an automated way by a device or manually. It is even for example possible to sever the knee cap and the thigh in an automated way and the knee cap and the drumstick manually, or the other way around.

FIG. 16 shows the situation in the exemplary embodiment of the system according to the invention in which first the drumstick is severed from the knee cap and then the knee cap is severed from the interconnected thigh meat and knee meat. FIG. 16 shows the stage of the exemplary method according to the invention in which the drumstick is already severed from the knee cap, but the knee cap is not yet severed from the interconnected thigh meat and knee meat.

The knee cap 23 is severed from the drumstick 3 by cutting at a first cutting location 45 which is situated between the knee cap 23 and the drumstick 3. To effect this cutting, a drumstick-knee cap separator 60 (see FIG. 14) is provided.

The knee cap 23 is severed from the thigh 3 including the knee meat 23 by cutting at a second cutting location 46 which is situated between the knee cap 23 and the thigh 3, adjacent to the knee cap scraper 41. During this severing, the knee meat 23 and the thigh 5 remain interconnected. To effect this cutting, a knee cap-thigh separator 65 is provided (see FIG. 15).

The drumstick-knee cap separator 60 and the knee cap-thigh separator 65 can for example be a disk-shaped rotatable knife or a stationary knife.

In a possible embodiment, edge 47 of the knee cap scraper 41 and/or edge 48 of the counter element 42 are sharp. When in this embodiment, the counter element 42 and the knee cap scraper 41 are moved closer towards each other than the relative position shown in FIG. 13, with the edge 47 of the knee cap scraper 41 passing over the edge 48 of the counter element 42, the knee cap from the interconnected thigh meat 5 and knee meat 22 are severed in a scissors-like action. In this embodiment no rotating or stationary knife is required to sever the knee cap from the interconnected thigh meat 5 and knee meat 22. The edge 47 of the knee cap scraper 41 and the edge 48 of the counter element together act as the knee cap-thigh separator 65 in this embodiment.

In the embodiment shown in FIG. 13, the second cutting location 46 is located on the second side 44 of the knee cap scraper 41, so on the side of the knee cap 23. This way, the knee cap scraper 41 shields the thigh 3 and the knee meat 23 from accidental damage by the knee cap-thigh separator 65 when severing the knee cap 23 from the thigh 3 and knee meat 23. In an alternative embodiment, the second cutting location 46 is located on the first side 43 of the knee cap scraper 41, so on the side of the thigh 3 and the knee meat 23.

FIG. 17 and FIG. 18 show an alternative embodiment of the scraping motion device 50.

In this embodiment, a lifter 80 is provided which is arranged adjacent to or even extends through the counter block 42. The lifter 80 has a retracted position (FIG. 17) and an extended position (FIG. 18).

In this embodiment, the knee cap 23 is positioned relative to the knee cap scraper 41 by means of the counter element 42. This can for example be done by moving the counter element 42 to an end-of-stroke position and/or to a drumstick reference position as discussed in relation to FIG. 3-8.

While the knee cap 23 is positioned relative to the knee cap scraper 41, the lifter 80 is in the retracted position. FIG. 17 shows a positioned knee cap 23 with the lifter 80 in the retracted position.

When the knee cap 23 is positioned relative to the knee cap scraper 41, the knee cap scraper is brought into engagement with the front side of the leg product 1, adjacent to the knee cap 23 on the side of the drumstick.

After the knee cap scraper 41 is brought in this position, the lifter 80 is moved to its extended position, which is shown in FIG. 18.

By moving the lifter 80 towards and into its extended position, the knee cap 23 passes the knee cap scraper 41 and the knee meat 22 is scraped from the knee cap 23.

FIG. 19 shows a plurality of knee meat and thigh meat harvester devices 30 which are arranged in a carrousel machine 85. The carrousel machine 85 comprises a central body 86, in which cam track 51 are provided to control the movement of at least some elements of the knee meat and thigh meat harvester devices 30.

A drumstick support plate, a drumstick-knee cap separator 60 and a knee cap-thigh separator 65 are arranged adjacent to the carrousel machine 85.

The knee meat and thigh meat harvester devices 30 rotate around the central body 86 of the carrousel machine 85.

FIG. 20 shows a schematic top view of an exemplary embodiment of a system in which the system according to the invention is used.

The system comprises a poultry products conveyor 25\* with a track 26 and a plurality of poultry product carriers 25 at regular intervals along the track 26, e.g. as in WO93/13671, of which two are schematically indicated in FIG. 20. The poultry product carriers 25 are spaced apart from one another in the direction of the track 26 (indicated by the arrows) and which are movable along said track in a direction of conveyance DC. Each poultry product carrier 25 is adapted to hold at least one leg product 1 at the tarsal joint side end thereof such that the leg product is conveyed hanging from said poultry product carrier.

The exemplary embodiment of the system that is shown in FIG. 20 further comprises a knee cutter device 130, a thigh bone remover device 90 and a knee meat and thigh meat harvester device 30. These are all arranged along the track 26. The exemplary embodiment of the system that is shown in FIG. 20 further comprises a thigh deskinner device 95 which is also arranged along the track 26. The knee meat and thigh meat harvester device 30 can be a knee meat and thigh meat harvester device in accordance with the invention.

The knee cutter device 130 forms part of a system 128 for making a knee cut in a leg product. This system further comprises a plurality of leg positioner devices which are arranged in a carrousel machine 129. The system 128 for making a knee cut in a leg product is for example a system in accordance with the second aspect of the invention.

In the exemplary embodiment of the system that is shown in FIG. 20, the thigh deskinner device 95, the thigh bone remover device 90 and the knee meat and thigh meat harvester device 30 are all designed as carrousel machine. They all have processing devices and/or positioning devices which are moveable along a loop-shaped path, e.g. a circular path, an elliptical path or a path made up out of a combination of straight lines and curved lines. These processing devices and/or positioning devices move along with the poultry product carriers 25 of the poultry product conveyor when the poultry product carriers 25 move past the knee cutter device 130, the thigh deskinner device 95, the thigh bone remover device 90 and the knee meat and thigh meat harvester device 30, respectively.

The invention claimed is:

1. A method for harvesting knee meat together with thigh meat from a defeathered whole leg poultry product, the method comprising the steps of:
providing a defeathered whole leg poultry product comprising:
a thigh comprising at least thigh meat;
a drumstick comprising at least a tibia bone and drumstick meat, wherein the tibia bone has a knee side end and a tarsal joint side end; and
a knee joint comprising at least knee meat, the knee cap and a connection between the thigh and the drumstick, the defeathered whole leg poultry product having a front side, which is the side on which the knee cap is located, and a rear side, which is the side opposite to the front side, wherein in the defeathered whole leg poultry product, a transverse cut has been provided at the knee joint that extends generally in a direction transverse to the tibia bone, the transverse cut extending from the rear side of the defeathered whole leg poultry product to a cut end located adjacent to the rear side of the knee cap so that the thigh and the drumstick are connected to each other and the knee cap is intact, by which transverse cut a drumstick side cut plane and a thigh side cut plane are created;
arranging the defeathered whole leg poultry product in a poultry product carrier of a poultry products conveyor, wherein the defeathered whole leg poultry product is suspended from said poultry product carrier and wherein the poultry product carrier engages the defeathered whole leg poultry product at or adjacent to the tarsal joint side end of the tibia bone;
providing a knee meat scraper device comprising a knee cap scraper and a counter element, the knee meat scraper device having an open state and a closed state, wherein in the open state the knee cap scraper and the counter element are spaced apart from each other, so as to allow the knee joint of the defeathered whole leg poultry product to be introduced between the knee cap scraper and the counter element;
while the defeathered whole leg poultry product is suspended from said poultry product carrier and the knee meat scraper device is in the open state, arranging the defeathered whole leg poultry product adjacent to the counter element, with the drumstick side cut plane facing the counter element;
bringing the knee meat scraper device in a closed state in which the knee cap scraper engages the defeathered whole leg poultry product at the front side adjacent to the knee cap on the drumstick side of said kneecap and in which the counter element engages the defeathered whole leg poultry product at or adjacent to the rear side of the knee cap,
performing a scraping step in which the drumstick and the knee cap scraper are moved away from each other, thereby moving the knee cap past the knee cap scraper while the counter element engages the defeathered whole leg poultry product at or adjacent to the rear side of the knee cap, therewith scraping the knee meat from the knee cap while leaving the knee meat connected to the thigh, so that after the scraping step the knee meat and thigh meat are present on a first side of the knee cap scraper and the knee cap is present on a second side of the knee cap scraper.

2. The method according to claim 1, wherein the drumstick is supported by a drumstick support element when the drumstick and the knee meat scraper device are being moved away from each other, the drumstick support element engaging the drumstick at the drumstick side cut plane.

3. The method according to claim 2, wherein the counter element and/or the knee cap scraper bring the drumstick into engagement with the drumstick support element.

4. The method according to claim 3, wherein before severing the knee cap from the drumstick, the knee cap is pulled away from the drumstick side cut plane, and wherein the first cutting location is aligned with the drumstick side cut plane or between the drumstick side cut plane and the knee cap when the knee cap is severed from the drumstick.

5. The method according to claim 2, wherein before severing the knee cap from the drumstick, the knee cap is pulled away from the drumstick side cut plane, and wherein the first cutting location is aligned with the drumstick side cut plane or between the drumstick side cut plane and the knee cap when the knee cap is severed from the drumstick.

6. The method according to claim 1, wherein before severing the knee cap from the drumstick, the knee cap is pulled away from the drumstick side cut plane, and wherein the first cutting location is aligned with the drumstick side cut plane or between the drumstick side cut plane and the knee cap when the knee cap is severed from the drumstick.

7. The method according to claim 6, wherein the pulling is caused by the scraping of the knee meat from the knee cap.

8. The method according to claim 1, wherein, before the knee meat scraper is brought into a closed state, the method further comprising the steps of:
moving the counter element towards the drumstick until the counter element engages the drumstick side cut plane; and
moving the drumstick by the counter element towards and into a drumstick reference position, in which predetermined drumstick reference position, the position of the drumstick side cut plane relative to the knee cap scraper is known.

9. The method according to claim 8, wherein the counter element has a front side and a top side, and, the method further comprising the steps of:
moving the counter element towards the rear side of the knee cap, until the front side of the counter element is into engagement with the rear side of the knee cap;
moving the knee joint to an end-of-stroke position by the counter element;
wherein the steps of moving the counter element toward the rear side of the knee cap and moving the knee joint are carried out prior to moving the counter element towards the drumstick until the counter element engages the drumstick side cut plane, and
wherein the front side of the counter element remains in contact with the rear of the knee cap when the counter element is moved from the end-of-stroke position towards and into the drumstick reference position.

10. The method according to claim 1, wherein the knee cap scraper and the counter element separate the knee cap from the interconnected thigh and the knee meat in a scissors-like action.

11. The method according to claim 1, wherein the defeathered whole leg poultry product is provided with the thigh further comprising a thigh bone.

12. The method according to claim 11, wherein the method further comprises the step of removing the thigh bone from the thigh, prior to the step of scraping the knee meat from the knee cap.

13. The method according to claim 1, wherein the scraped knee cap is severed from the drumstick by cutting at a first cutting location situated between the knee cap and the drumstick.

14. The method according to claim 1, wherein the knee cap is severed from the thigh and the knee meat by cutting at a second cutting location situated between the knee cap and the thigh, adjacent to the knee cap scraper, during which severing the knee meat and the thigh remain interconnected.

15. A system for harvesting knee meat together with thigh meat from a defeathered whole leg poultry product, wherein the defeathered whole leg poultry product comprises:
a thigh comprising at least thigh meat;
a drumstick comprising at least a tibia bone and drumstick meat, wherein the tibia bone has a knee side end and a tarsal joint side end; and
a knee joint comprisings at least knee meat, the knee cap and a connection between the thigh and the drumstick, the defeathered whole leg poultry product having a front side, which is the side on which the knee cap is located, and a rear side, which is the side opposite to the front side, wherein in the defeathered whole leg poultry product, a transverse cut has been provided at the knee joint that extends generally in a direction transverse to the tibia bone, the transverse cut extending from the rear side of the defeathered whole leg poultry product to a cut end located adjacent to the rear side of the knee cap so that the thigh and the drumstick remain connected to each other and the knee cap remains intact, by which transverse cut a drumstick side cut plane and a thigh side cut plane are created,
wherein the system comprises:
a poultry products conveyor, comprising:
a track;
a plurality of poultry product carriers spaced apart from one another in the direction of the track and movable along said track, wherein each poultry product carrier is adapted to hold at least one defeathered whole leg poultry product at the tarsal joint side end thereof such that the poultry product is conveyed hanging suspended from said carrier,
a knee meat and thigh meat harvester device arranged along the track of the poultry products conveyor, the knee meat and thigh meat harvester device comprising:
a knee meat scraper device, comprising:
a knee cap scraper; and
a counter element arranged at a distance from the track of the poultry products conveyor that enables to arrange the defeathered whole leg poultry product adjacent to the counter element, with the drumstick side cut plane facing the counter element, while the defeathered whole leg poultry product is suspended from said poultry product carrier, wherein the knee meat scraper device has an open state and a closed state, wherein in the open state the knee cap scraper and the counter element are spaced apart from each other, allowing the knee joint of the defeathered whole leg poultry product to be introduced between the knee cap scraper and the counter element, and wherein in the closed state the knee cap scraper engages the front of the defeathered whole leg poultry product at or adjacent the knee cap on the drumstick side of said kneecap and the counter element engages the defeathered whole leg poultry product at or adjacent the rear of the knee cap in order to allow scraping of the knee meat from the knee cap;
a scraping motion device adapted to cause a relative movement of the drumstick and the knee cap scraper away from each other, thereby moving the knee cap past the knee cap scraper while the counter element engages the defeathered whole leg poultry product at or adjacent to the rear side of the knee cap, thereby inducing the scraping of the knee meat from the knee cap while leaving the knee meat connected to the thigh, wherein after the scraping the knee meat and thigh meat are present on a first side of the knee cap scraper and the knee cap on a second side of the knee cap scraper.

16. The system according to claim 15, wherein the knee meat and thigh meat harvester device further comprises a drumstick support element adapted to support the drumstick when the drumstick and the knee meat scraper device are being moved away from each other, the drumstick support element being arranged and adapted to engage the drumstick at the drumstick side cut plane.

17. The system according to claim 16, wherein the drumstick support element is arranged and adapted to engage the tibia bone when the drumstick and the knee meat scraper device are being moved away from each other.

18. The system according to claim 16, wherein the drumstick support element is a drumstick support plate having a drumstick support surface adapted and arranged to engage the drumstick side cut plane of the drumstick during the scraping, the drumstick support plate comprising an aperture extending from the drumstick support surface to the side of the drumstick support plate opposite to the drumstick support surface, the aperture allowing the drumstick to be arranged on the side of the drumstick support surface and the thigh to be arranged on the side of the drumstick support plate opposite to the drumstick support surface during the scraping, wherein the counter element and the knee cap scraper are arranged on the side of the drumstick support plate opposite to the drumstick support surface.

19. The system according to claim 16, wherein the scraping motion device comprises a positioner driver device adapted to move the knee cap scraper and/or the counter element to engage the defeathered whole leg poultry product and to bring the drumstick of said defeathered whole leg poultry product into engagement with the drumstick support element.

20. The system according to claim 15, wherein the scraping motion device comprises a scraper driver device adapted to move the knee cap scraper away from the drumstick in order to induce the scraping of the knee meat from the knee cap.

21. The system according to claim 15, wherein the scraping motion device comprises a positioner driver device adapted to:

move the counter element towards the drumstick until the counter element engages the drumstick side cut plane;

move the drumstick by the counter element towards and into a drumstick reference position, in which predetermined drumstick reference position, the position of the drumstick side cut plane relative to the knee cap scraper is known.

22. The system according to claim 15, wherein the knee cap scraper and the counter element are moveable relative to each other to perform a scissors-like cutting operation and therewith act as the knee cap thigh separator.

23. The system according to claim 15, wherein the system further comprises a drumstick knee cap separator adapted and arranged to sever the knee cap from the drumstick after the knee meat has been scraped off the knee cap, the drumstick knee cap separator being adapted and arranged to make a cut at a first cutting location situated between the knee cap and the drumstick.

24. The system according to claim 15, wherein the system further comprises a knee cap thigh separator adapted and arranged to sever the knee cap from the thigh and the knee meat after the knee meat has been scraped from the knee cap, the knee cap thigh separator being adapted and arranged to make a cut at a second cutting location situated between the knee cap and the thigh, adjacent to the knee cap scraper, during which severing the knee meat and the thigh remain interconnected.

* * * * *